United States Patent [19]

Okumura et al.

[11] Patent Number: 5,451,632
[45] Date of Patent: Sep. 19, 1995

[54] POLYCARBONATE-POLYORGANOSILOXANE COPOLYMER AND A RESIN COMPOSITION

[75] Inventors: Ryozo Okumura; Masaya Okamoto, both of Ichihara, Japan

[73] Assignee: Idemitsu Petrochemical Co., Ltd., Tokyo, Japan

[21] Appl. No.: 131,144

[22] Filed: Oct. 4, 1993

[30] Foreign Application Priority Data

Oct. 26, 1992 [JP] Japan .................. 4-287431
Mar. 22, 1993 [JP] Japan .................. 5-061645
Mar. 25, 1993 [JP] Japan .................. 5-066458

[51] Int. Cl.[6] ............................................ C08L 83/10
[52] U.S. Cl. .................................. 524/537; 524/418;
524/423; 524/424; 524/425; 524/430; 524/432;
524/435; 524/436; 524/437; 524/440; 524/441;
524/445; 524/454; 524/455; 525/92 E;
525/104; 525/464
[58] Field of Search .................. 525/92, 104, 464;
528/202; 524/537, 418, 427, 424, 425, 430, 432,
435, 436, 437, 440, 441, 449, 454, 455

[56] References Cited

U.S. PATENT DOCUMENTS

| | | |
|---|---|---|
| 4,600,632 | 7/1986 | Paul et al. . |
| 4,804,708 | 2/1989 | Wittmann et al. .................. 525/67 |
| 5,109,045 | 4/1992 | Price et al. ............................ 524/94 |
| 5,185,425 | 2/1993 | Komatsu .............................. 528/198 |

FOREIGN PATENT DOCUMENTS

| | | |
|---|---|---|
| 0376052 | 7/1990 | European Pat. Off. . |
| 0386511 | 9/1990 | European Pat. Off. . |
| 0434848 | 7/1991 | European Pat. Off. . |
| 0500129 | 8/1992 | European Pat. Off. . |
| 3414116 | 10/1985 | Germany . |
| 3-200862 | 9/1991 | Japan . |

*Primary Examiner*—Ralph H. Dean
*Attorney, Agent, or Firm*—Frishauf, Holtz, Goodman, Langer & Chick

[57] ABSTRACT

A polycarbonate-polyorganosiloxane copolymer comprising a repeating unit I represented by the general formula:

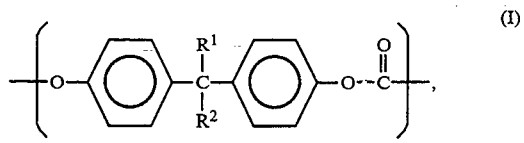

a repeating unit II represented by the general formula:

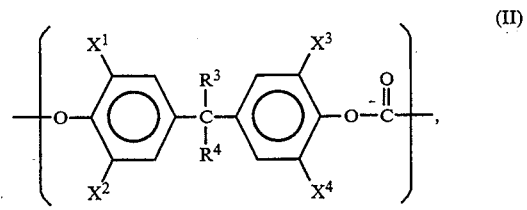

a structural unit III represented by the general formula:

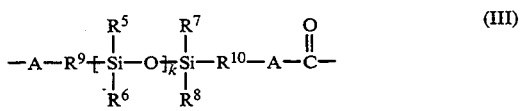

and a terminal group IV of polyhalogenophenoxy group represented by the general formula:

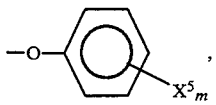

wherein symbols in the formulae are the same as those described in the specification, is disclosed. Content of the repeating unit II based on the total of contents of the repeating unit I and the repeating unit II and content of the structural unit III based on the total of contents of the repeating unit I, the repeating unit II and the structural unit III are in specific ranges, respectively. Resin (Abstract continued on next page.)

compositions comprising the polycarbonate-polyorganosiloxane copolymer and a resin, such as a polycarbonate, a fluororesin, a styrenic resin and the like, inorganic filler or pigment is also disclosed. The copolymer and the resin composition comprising said copolymer have excellent flame resistance, impact resistance, transparency and mold releasing property. They have also excellent flow property, sliding property or solvent resistance.

18 Claims, 4 Drawing Sheets

F I G. 1
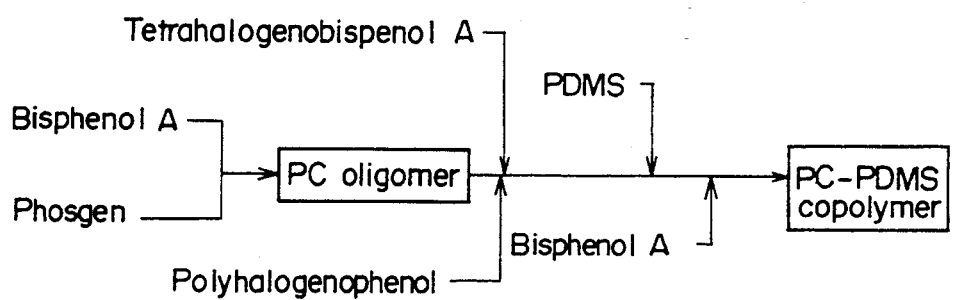
F I G. 2
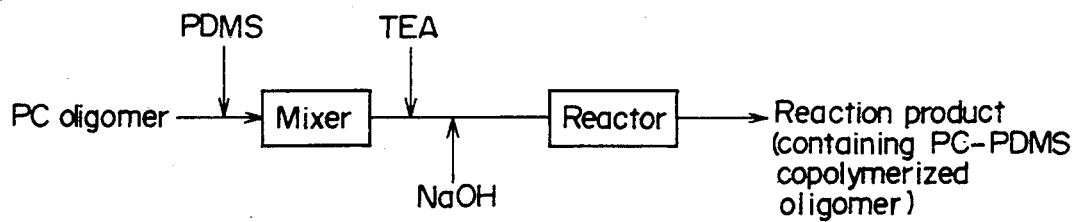

POLYCARBONATE-POLYORGANOSILOXANE COPOLYMER AND A RESIN COMPOSITION

BACKGROUND OF THE INVENTION

1. Field of the Invention

The present invention relates to a polycarbonate-polyorganosiloxane copolymer and a resin composition comprising said copolymer. More particularly, the present invention relates to a novel polycarbonate-polyorganosiloxane copolymer having excellent flame resistance, impact resistance, transparency and mold releasing property and a resin composition comprising said copolymer and an inorganic filler, a pigment or other resins and having an excellent flow property, sliding property, solvent resistance or the like.

2. Description of Related Art

As copolymerized polycarbonates containing halogen and having flame resistance, various copolymers have heretofore been proposed. Examples of such copolymer are: a copolymer of tetrabromobisphenol A (TBA) and bisphenol A (BPA) (Japanese Patent Publications 1971-40715 and 1972-24660), a copolymer of tetrabromobisphenolsulfone (TBS) and BPA (Japanese Patent Application Laid Open No. 1976-123294), a copolymer of a statistical mixture of halogenated bisphenol and BPA (Japanese Patent Application Laid Open No. 1976-136796), a blend of a copolymer of thiodiphenol (TDP) and BPA and a copolymer of tetrabromobisphenol A (TBA) and BPA (Japanese Patent Application Laid Open Nos. 1977-140597 and 1979-50065) and a copolymer of tetrabromothiodiphenol (TBTDP) and BPA (Japanese Patent Application Laid Open No. 1981-99226).

These copolymers are obtained by copolymerization of halogenated bisphenols in which benzene rings of bisphenols are substituted with halogen to contain necessary amount of halogen for providing flame resistance.

However, these copolymers have a drawback that these halogenated bisphenols have to be used in relatively large amounts and, accordingly, mechanical strength (particularly, impact strength) of the polycarbonates has to be sacrificed.

As another kind of polycarbonate containing halogen, a polycarbonate prepared by using a halogenated phenol as the terminator of chain end was also disclosed (Japanese Patent Publication 1971-40715). However, simultaneous exhibition of both of the flame resistance and the mechanical strength could not be realized in this case either.

As a method of improving the drawback described above, methods of copolymerizing BPA and a halogenated bisphenol A by using a polyhalogenophenol as the chain terminator are known (for example, Japanese Patent Application Laid Open Nos. 1989-79227, 1989-79228 and 1991-200833). Even though the flame resistance and the mechanical strength can be provided simultaneously by this method, the present inventors made further study and succeeded in achieving still better flame resistance and impact resistance.

The present inventors discovered that a polycarbonate-polyorganosiloxane copolymer comprising a specific polycarbonate derived from a bisphenol and a halogenated bisphenol and a specific polyorgnosiloxane polymer and a resin composition comprising said copolymer and an inorganic filler, a pigment or other resins have the properties superior to the heretofore known materials described above. The present invention was completed on the basis of the discovery.

SUMMARY OF THE INVENTION

Thus, the present invention provides a polycarbonate-polyorganosiloxane copolymer comprising:

(a) a repeating unit I represented by the general formula (I):

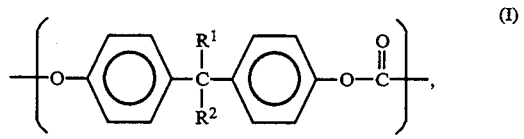

wherein $R^1$ and $R^2$ are, respectively, a hydrogen atom or an alkyl group having 1 to 4 carbon atoms and may be the same or different from each other;

(b) a repeating unit II represented by the general formula (II):

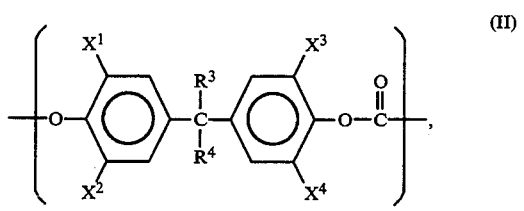

wherein $R^3$ and $R^4$ are, respectively, a hydrogen atom or an alkyl group having 1 to 4 carbon atoms and may be the same or different from each other and $X^1$ to $X^4$ are, respectively, a halogen atom;

(c) a structural unit III represented by the general formula (III):

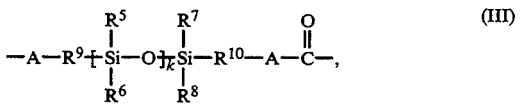

wherein $R^5$ to $R^8$ are, respectively, a hydrogen atom, an alkyl group having 1 to 6 carbon atoms or a phenyl group and may be the same or different from each other, $R^9$ and $R^{10}$ are, respectively, an organic residue containing an aliphatic group or an aromatic group, A is —O—, —NH— or a single bond and k is an integer of 1 to 500; and a terminal group IV of a polyhalogenophenoxy group represented by the general formula (IV):

wherein $X^5$ is a halogen atom, m is an integer of 1 to 5 and a plural of $X^5$ may be the same or different from each other when m is 2 or more; content of the repeating unit II in the main chain being in the range of 1 to 10 mol % based on the total of contents of the repeating unit I and the repeating unit II, content of the structural unit III being in the range of 0.01 to 10 weight % based on the total of contents of the repeating unit I, the repeating unit II and the structural unit III and viscosity average molecular weight being in the range of 10,000 to 50,000.

The present invention also provides a resin composition comprising said polycarbonate-polyorganosiloxane copolymer and inorganic filler, pigment or other resins.

Other and further objects, features and advantages of the invention will appear more fully from the following description.

BRIEF DESCRIPTION OF THE DRAWINGS

The invention will be described with reference to the accompanying drawings, wherein:

FIG. 1 is a schematic chart showing the flow of production in an example of the method of production of the polycarbonate-polyorganosiloxane copolymer of the present invention.

FIG. 2 is a schematic chart showing the flow of production of an oligomer of the polycarbonate-polyorganosiloxane copolymer in Example 4.

DESCRIPTION OF PREFERRED EMBODIMENT

Figure 3A:
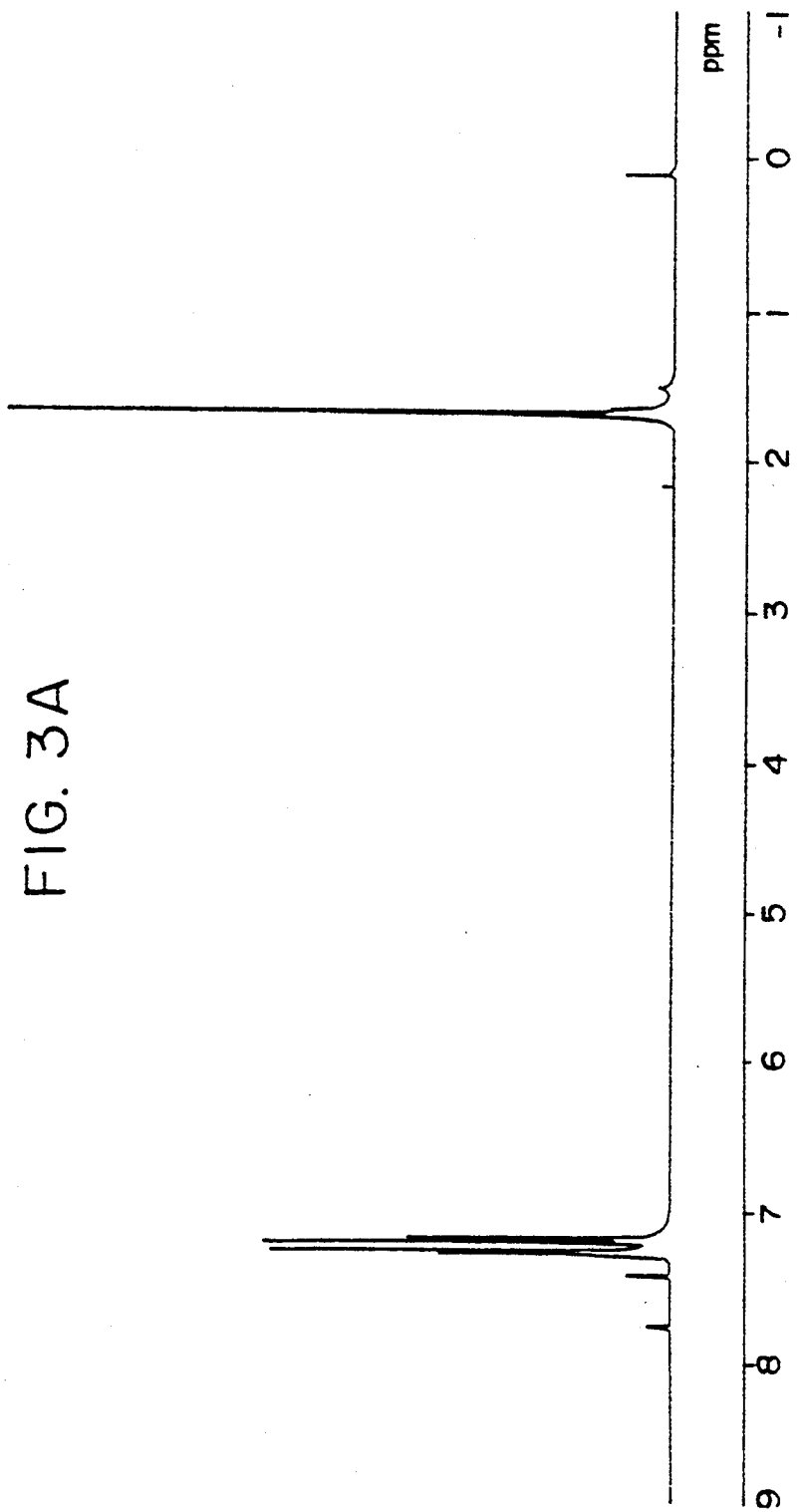
FIGS. 3A, 3B and 3C show a $^1$H-NMR spectrum of polycarbonate-polyorganosiloxane copolymer A obtained in Example 1.

In the polycarbonate-polyorganosiloxane copolymer of the present invention (abbreviated as PC-PDMS copolymer in the following description), the main chain comprises the repeating unit I represented by the general formula (I) as the component (a), the repeating unit II represented by the general formula (II) as the component (b) and the structural unit III represented by the general formula (III) as the component (c) and the terminal group IV of a polyhalogenophenoxy group represented by the general formula (IV).

In the repeating unit I represented by the general formula (I), $R^1$ and $R^2$ are, respectively, a hydrogen atom or an alkyl group having 1 to 4 carbon atoms, such as methyl group, ethyl group, propyl group and butyl group.

In the repeating unit II represented by the general formula (II), $X^1$ to $X^4$ are, respectively, a halogen atom, such as a bromine atom, a chlorine atom, a fluorine atom and an iodine atom. $X^1$ to $X^4$ may be the same or different from each other and are generally the same in many cases. $R^3$ and $R^4$ in the general formula (II) are, respectively, a hydrogen atom or an alkyl group having 1 to 4 carbon atoms, such as methyl group, ethyl group, propyl group and butyl group, similarly to $R^1$ and $R^2$ described above.

In the structural unit III represented by the general formula (III), $R^5$ to $R^8$ are, respectively, a hydrogen atom, an alkyl group having 1 to 6 carbon atoms or a phenyl group. $R^5$ to $R^8$ may be the same or different from each other. $R^9$ and $R^{10}$ are, respectively, an organic residue containing an aliphatic group or an aromatic group. A is —O—, —NH— or a single bond and k is an integer of 1 to 500.

The PC-PDMS copolymer of the present invention has at the terminal part, particularly at the both terminal parts, of the molecule a terminal group IV of a polyhalogenophenoxy group represented by the general formula (IV). In the terminal group represented by the general formula (IV), $X^5$ is a halogen atom, such as a bromine atom, a chlorine atom, a fluorine atom or an iodine atom, similarly to $X^1$ to $X^5$ described above, and m is an integer of 1 to 5.

$X^1$ to $X^4$ in the repeating unit II represented by the general formula (II) and $X^5$ in the terminal group IV represented by the general formula (IV) may be the same or different from each other.

The PC-PDMS copolymer has the structure that contains the repeating units I and II and the structural unit III and has the terminal group IV of a polyhalogenophenoxy group bonded to the terminal part, preferably to the both terminal parts, of the molecule. The repeating units I and II and the structural unit III may be bonded together to form a random copolymer, a block copolymer, an alternating copolymer or a copolymers of like other forms.

In PC-PDMS copolymer, content of the repeating unit II represented by the general formula (II) of the component (b) is in the range of 1 to 10 tool %, preferably in the range of 2 to 8 mol %, based on the total of contents of the repeating units I and II. When the content of the repeating unit II is less than 1 tool %, the effect of improvement of flame resistance is not exhibited. When the content is more than 10 mol %, mechanical strength, such as impact strength, is decreased.

Content of the structural unit III represented by the general formula (III) as the component (c) is in the range of 0.01 to 10 weight %, preferably in the range of 0.02 to 8 weight %, based on the total of contents of the repeating units I, the repeating unit II and the structural unit III. When the content of the structural unit III is less than 0.01 weight %, flame resistance and mechanical property, such as impact resistance, is decreased. When the content is more than 10 weight %, heat resistance is decreased. Thus, contents out of the specified range are not preferable.

The viscosity average molecular weight of the copolymer is in the range of 10,000 to 50,000 and preferably in the range of 12,000 to 40,000. When the viscosity average molecular weight is less than 10,000, mechanical strength, such as impact strength, is decreased. When the viscosity average molecular weight is more than 50,000, the flow property is decreased and the moldability is deteriorated. Thus, viscosity average molecular weights out of the specified range are not preferable.

The content of halogen in the PC-PDMS copolymer is generally 4 weight % or more and preferably 4.5 weight % or more. When the content of halogen is less than 4 weight %, flame resistance is decreased and the content is not preferable.

A method of production is described in the following as an example of an efficient and preferable method of production of PC-PDMS copolymer (with reference to FIG. 1 which is the chart showing the flow of production of an example of the method of production of the polycarbonate-polyorganosiloxane copolymer). However, the method of production is not limited to this method described as an example.

First, a polycarbonate oligomer (abbreviated as PC oligomer in the following description) is prepared by reaction of a bisphenol represented by the following general formula (V):

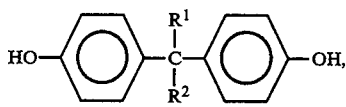

wherein $R^1$ and $R^2$ are the same as those described above, and phosgene in a solvent, such as methylene chloride, in the presence of a generally known acid acceptor and a generally known molecular weight modifier according to necessity, until substantially all the phosgene present in the system is consumed. PC oligomer thus prepared contains the repeating unit I represented by the general formula (I) which is formed by the reaction of the bisphenol and phosgene in the polycondensation reaction described above.

In the reaction to prepare PC oligomer containing the repeating unit I represented by the general formula (I), 110 to 150 mol of phosgene is brought into the reaction with 100 mol of the bisphenol. In this reaction, the bisphenol is generally charged in the form of an alkaline aqueous solution. A solvent, such as methylene chloride, chlorobenzene, chloroform, carbon tetrachloride and the like, and a catalyst, such as triethylamine, trimethylbenzylammonium chloride and the like, used according to necessity, are mixed to the solution of the bisphenol in specified amounts and stirred. Phosgene is blown into the solution for 1 to 3 hours at the reaction temperature of 30° to 70° C. to perform an interfacial polycondensation reaction. Thus, PC oligomer can be prepared. It is preferred that the reaction system is cooled with water or ice water because heat is generated in the reaction system. It is also preferred that the pH of the reaction system is kept at a value of 10 or higher by adding an alkaline compound while pH of the reaction system is monitored by a pH meter because the reaction system shifts to the acidic side with progress of the reaction. The PC oligomer thus obtained is a mixture of oligomers in the range of monomer to 10-mer having an average molecular weight of 2000 or lower.

After substantially all the phosgene in the reaction system has reacted, an alkaline aqueous solution of a tetrahalogenobisphenol represented by the following general formula (VI):

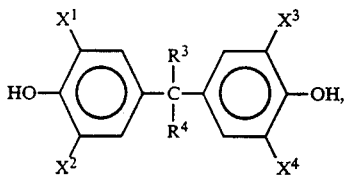

wherein $R^3$, $R^4$ and $X^1$ to $X^4$ are the same as those described above, and an alkaline aqueous solution of a polyhalogenophenol represented by the following general formula (VII):

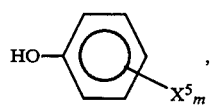

wherein $X^5$ and m are the same as those described above, and a catalyst, such as triethylamine, trimethylbenzylammonium chloride and the like, are mixed with PC oligomer having the repeating unit I represented by the general formula (I) in specified amounts and stirred to perform the polymerization. Thus, a polycarbonate copolymerized oligomer (abbreviated as PC copolymerized oligomer in the following description) is prepared.

PC copolymerized oligomer can be obtained by bringing 1.2 to 14 mol of the tetrahalogenobisphenol and 0.3 to 6.0 mol of the polyhalogenophenol into reaction with 100 of the bisphenol unit in PC oligomer.

PC copolymerized oligomer thus obtained contains the repeating unit II represented by the general formula (II) formed by the reaction with the tetrahalogenobisphenol described above and the repeating unit I represented by the general formula (I).

Examples of the bisphenol represented by the general formula (V) described above are 2,2-bis(4-hydroxyphenyl)propane [bisphenol A]; bis(4-hydroxyphenyl)methane [bisphenol F]; 2,2-bis(4-hydroxyphenyl)butane [bisphenol B]; 2,2-bis-(4-hydroxyphenyl)pentane; 3,3-bis(4-hydroxyphenyl)pentane; 2,2-bis(4-hydroxyphenyl)hexane; 3,3-bis(4-hydroxyphenyl)hexane and the like. Among them, bisphenol A is particularly preferably used.

Examples of the tetrahalogenobisphenol represented by the general formula (VI) are tetrabromobisphenol A, tetrachlorobisphenol A, tetrafluorobisphenol A, tetraiodobisphenol A, tetrabromobisphenol F, tetrachlorobisphenol F, tetrachlorobispheno B and the like. Among them tetrabromobisphenol A is particularly preferably used.

Examples of the polyhalogenophenol represented by the general formula (VII) are bromophenol, chlorophenol, fluorophenol, dibromophenol, dichlorophenol, difluorophenol, tribromophenol, trichlorophenol, trifluorophenol, tetrabromophenol, tetrachlorophenol, tetrafluorophenol, pentabromophenol, pentachlorophenol, pentafluorophenol and the like. Among them, tribromophenol is particularly preferably used. A part (50 mol % or less) of the polyhalogenophenol may be replaced with a monohydric phenol, such as p-tert-butylphenol, phenol and the like.

Examples of the catalyst described above are tributylamine, tetramethylammonium chloride, tetraethylammonium chloride, tetrabutylammonium chloride, trimethylphenylammonium chloride, triethylphenylammonium chloride, tetrabutylammonium bromide and the like. Among them, triethylamine is preferable.

As the alkaline aqueous solution described above, an aqueous solution of an alkaline compound, such as sodium hydroxide, potassium hydroxide, sodium carbonate and the like, can be used.

The reaction mixture thus obtained is separated into an aqueous phase and an organic phase containing PC copolymerized oligomer described above by separation with standing or with centrifugal method. The organic phase containing PC copolymerized oligomer can be used in the next process of the preparation. The reaction mixture may be used in the next process of the preparation without the separation.

PC copolymerized oligomer contained in the reaction mixture or in the separated organic phase is subsequently mixed with a polyorganosiloxane (PDMS) corresponding to the structural unit III represented by the general formula (III) in the condition of substantial absence of an alkaline substance and then brought into reaction with a bisphenol in the presence of an alkaline compound to prepare PC-PDMS copolymer.

As the polyorganosiloxane corresponding to the structural unit III, various compounds can be used and PDMS having the following general formula (VIII):

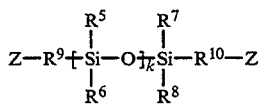

is preferably used because of good reactivity.

In the general formula (VIII), $R^5$ to $R^8$ are, respectively, a hydrogen atom, an alkyl group having 1 to 6 carbon atoms or a phenyl group and may be the same or different from each other. A plural of $R^5$ and $R^6$ present in the molecule by the number shown by k may be the same or different from each other, respectively.

$R^9$ and $R^{10}$ are, respectively, an organic residue containing an aliphatic group or an aromatic group. Z is a hydroxyl group, an amino group, a carboxyl group, an acid chloride group or a phenolic hydroxyl group and k is an integer of 1 to 500, preferably 5 to 400.

When k is 1 to 100, PC-PDMS copolymer obtained has excellent transparency.

In the preparation of PC-PDMS, 0.01 to 14 weight parts, preferably 0.02 to 12 weight parts, of PDMS described above is brought into reaction with 100 weight parts (as the amount of solid) of PC copolymerized oligomer described above.

The bisphenol is brought into reaction in an amount of 10 to 30 mol per 100 of the bisphenol A unit in PC oligomer.

The tetrahalogenobisphenol, the polyhalogenophenol and the bisphenol are added as alkaline aqueous solutions and PDMS is added without dilution or as a methylene chloride solution. Order of the addition of these components is not particularly limited. However, it is preferred that the bisphenol is added last. Reaction time is 5 minutes to 2 hours and reaction temperature is 0° to 70° C.

PC-PDMS copolymer of the present invention is prepared by mixing PC copolymerized oligomer containing the repeating unit I and the repeating unit II described above and PDMS corresponding to the structural unit III described above in the condition of substantial absence of an alkaline compound, then bringing them into reaction in the presence of the alkaline compound and the catalyst and further bringing the reaction product into reaction with the bisphenol.

As described above, for the preparation of PC-PDMS copolymer of the present invention, first PC copolymerized oligomer and PDMS are mixed by using an organic solvent, such as methylene chloride, in a mixer in a condition of the substantial absence of an alkaline compound.

The mixer is not particularly limited so long as the mixer can mix fluid substances. It may be either a vertical type mixer or a horizontal type mixer, either a dynamic mixer or a static mixer or may be an orifice, a centrifugal pump or the like.

Examples of the dynamic mixer are Multiline Mixer (a product of Satake Chemical Equipment Mfg., Ltd.), Komatsu Soulzer-Disintegrater (a product of Komatsu Zenoah Co., Ltd.), Pipeline Homomixer (a product of Tokushu Kika Kogyo Co., Ltd.) and the like. Examples of the static mixer are static mixers of Kenics type, static mixers of Slouzer type, static mixers of Toray type and the like.

The mixture of PC copolymerized oligomer and PDMS mixed in this mixer is next brought into reaction with the bisphenol in a reactor in the presence of an alkaline compound and a catalyst and thus the reaction product of PC-PDMS copolymer can be obtained.

In another method, the mixture of PC copolymerized oligomer and PDMS mixed in the mixer is next brought into reaction in a reactor in the presence of an alkaline compound and a catalyst and PC-PDMS copolymerized oligomer is formed. PC-PDMS oligomer thus obtained is further brought into reaction with the bisphenol in the presence of a alkaline compound and a catalyst and the reaction product of PC-PDMS copolymer can be obtained. The tetrahalogenobisphenol represented by the general formula (VI) may be used as a part of the bisphenol.

Because the reaction product of PC-PDMS copolymer obtained by the reaction of PC copolymerized oligomer and PDMS contains an excess amount of PC copolymerized oligomer by the mol ratio, the reaction product PC-PDMS of copolymer is a mixture of PC-PDMS copolymerized oligomer in which PC copolymerized oligomer is attached to the both ends of PDMS by the reaction and PC copolymerized oligomer.

The reactor is not particularly limited so long as the reactor can mix fluid substances by stirring and may be a vertical type or a horizontal type. An example of the reactor is Pipeline Homomixer (a product of Tokushu Kika Kogyo Co., Ltd.). Temperature of reaction in the reactor is in the range of 0° to 60° C. and preferably in the range of 10° to 50° C. The reaction can be performed when residence time of the reaction is 5 seconds or more.

Examples of the alkaline compound used for obtaining PC-PDMS copolymer or PC-PDMS copolymerized oligomer described above are NaOH, KOH and the like.

The alkaline compound is added in an amount of 1 to 20 and preferably 1.1 to 10 represented by the mol ratio to the terminal group of PDMS. When the amount of the alkaline compound is less than 1, the reaction of PC copolymerized oligomer and PDMS does not proceed completely and the amount is not preferable. When the amount of the alkaline compound is more than 20, decomposition of chloroformate group in PC copolymerized oligomer becomes significant and molecular weight of PC-PDMS copolymer obtained does not increase. Thus, the amount of more than 20 is not preferable.

As the catalyst, a tertiary amine or a quaternary ammonium salt can be used. Specific examples of such catalyst are tertiary amines, such as trimethylamine, triethylamine, tripropylamine and the like, and quaternary ammonium salt, such as trimethylbenzylammonium chloride, trimethylbenzylammonium chloride and the like.

The amount of addition of the catalyst is in the range of $1.0 \times 10^{-4}$ to $5.0 \times 10^{-2}$, preferably $5.0 \times 10^{-4}$ to $1.0 \times 10^{-2}$, represented by mol ratio to the chloroformate group in PC copolymerized oligomer. When the amount is less than $1.0 \times 10^{-4}$, the reaction proceeds slowly. When the amount is more than $5.0 \times 10^{-2}$, the effect of the catalyst is not so much exhibited as expected from the added amount and the addition more than this amount is not necessary.

The copolymer obtained herein is substantially a mixture of a copolymer containing PDMS and a copolymer not containing PDMS. When the content of PDMS is smaller, or when k is larger, content of the copolymer not containing PDMS is increased. The mixture thus obtained is referred to as PC-PDMS copolymer in the present invention.

The resin composition of the present invention is obtained by compounding PC-PDMS copolymer described above as the component (A) and a resin, such as a polycarbonate, a fluororesin, a styrenic resin, a polytetrafluoroethylene having the ability of fibril formation and the like, pigment or inorganic filler as the component (B).

As the polycarbonate (PC) of the component (B) which constitutes one of the components of the resin composition of the present invention, various kinds of compound can be used. PC is preferably a compound which can be easily prepared by reaction of a dihydric phenol represented by the general formula (IX):

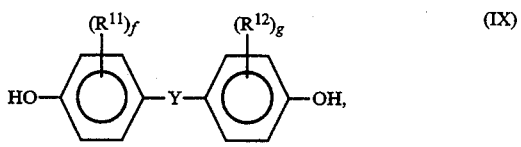

wherein $R^{11}$ and $R^{12}$ are, respectively, a halogen atom, such as a chlorine atom, a bromine atom, a fluorine atom and a iodine atom, or an alkyl group having 1 to 8 carbon atoms and may be the same or different from each other, f and g are, respectively, an integer of 0 to 4 and Y is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$, —O—, —CO— or a bonding group represented by the general formulae (X) or (X'):

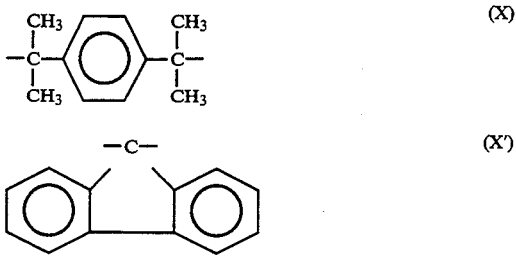

and phosgene or a diester of carbonic acid.

Thus, PC is prepared in a solvent, such as methylene chloride, by interfacial polycondensation of the dihydric phenol and a carbonate precursor, such as phosgene, or by transesterification of the dihydric phenol and a carbonate precursor, such as diphenyl carbonate in the presence of a generally known acid acceptor or a generally known chain terminator.

As the dihydric phenol represented by the general formula (IX), various compounds can be used and 2,2-bis(4-hydroxyphenyl)propane [bisphenol A] is particularly preferable among them. Examples of the dihydric phenol other than bisphenol A are: bis(4-hydroxyphenyl)alkanes other than bisphenol A, such as 1,1-(4-hydroxylphenyl)methane; 1,1-(4-hydroxyphenyl)ethane; 4,4'-dihydroxydiphenyl; bis (4-hydroxyphenyl)-cycloalkanes; bis(4-hydroxyphenyl)sulfides; bis(4-hydroxyphenyl)sulfones; bis(4-hydroxyphenyl)sulfoxides; bis(4-hydroxyphenyl)ethers; bis(4-hydroxyphenyl)ketones; 9,9-di(4-hydroxyphenyl)fluorene and the like and halogenated bisphenols, such as bis(3,5-dibromo-4-hydroxyphenyl)propane; bis(3,5-dichloro-4-hydroxyphenyl)propane and the like. As dihydric phenol other than those represented by the general formula (IX), for example, hydroquinone and the like can be used.

The dihydric phenol may be used singly or as a combination of two or more compounds.

Examples of the diester of carbonic acid are diaryl carbonates, such as diphenyl carbonate and the like, and dialkyl carbonates, such as dimethyl carbonate, diethyl carbonate and the like.

As the chain terminator, various compounds generally used for polymerization of polycarbonates which are monohydric phenols are used. Examples of such chain terminator are phenol, p-cresol, p-tert-butylphenol, p-tert-octylphenol, p-cumylphenol, p-bromophenol, tribromophenol, nonylphenol and the like.

As another agent, a compound having 3 or more functional groups may be used as a branching agent. Examples of such branching agent are 1,1,1-tris(4-hydroxyphenyl)ethane; α,α',α"-tris(4-hydroxyphenyl)-1,3,5-triisopropylbenzene; 1-(α-methyl-α-(4'-hydroxyphenyl)ethyl)-4-(α,α'-bis(4"-hydroxyphenyl)ethyl)benzene, fluoroglucine, trimellitic acid, isatine bis(o-cresol) and the like.

The viscosity average molecular weight of the polycarbonate resin thus obtained is in the range of 10,000 to 50,000 and preferably in the range of 15,000 to 40,000. When the viscosity average molecular weight is less than 10,000, mechanical property, such as impact resistance, is decreased. When the viscosity average molecular weight is more than 50,000, flow property is decreased and moldability is deteriorated. Thus, viscosity average molecular weights out of the specified range are not preferable.

As the polycarbonate of the component (B), a commercial polycarbonate may be used, as well.

In the resin composition comprising (A) PC-PDMS copolymer described above and (B) PC, the resin composition comprises 0.1 to 99.9 weight % of PC-PDMS copolymer of the component (A) and 99.9 to 0.1 weight % of PC of the component (B). Content of the polyorganosiloxane of the structural unit III represented by the general formula (III) is in the range of 0.01 to 10 weight %, preferably in the range of 0.02 to 8 weight %, based on the total of contents of the component (A) and the component (B). When the content of the polyorganosiloxane in the resin composition is less than 0.01 weight %, mechanical strength is decreased and a resin composition having excellent flame resistance is scarcely obtained. When the content is more than 10 weight %, heat resistance of the resin composition is deteriorated. Thus, contents out of the specified range are not preferable.

It is preferred that content of a halogen atom in the resin composition is 4 weight % or more and preferably 4.5 weight % or more. When the content of a halogen atom is less than 4 weight %, flame resistance is decreased and the content is not preferable.

Another of the resin compositions of the present invention comprises the component (A) described above and inorganic filler as the component (B).

As the inorganic filler of the component (B), various materials can be used. Examples of such inorganic filler are glass materials, carbon fibers and other inorganic fillers.

As the glass material, for example, glass fiber, glass beads, glass flakes, glass powder or the like can be used.

The glass fiber used herein may be any of glass fibers containing alkali, glass fibers of low alkali content and glass fibers containing no alkali. The length of the fiber is in the range of 0.1 to 8 mm and preferably in the range of 0.3 to 6 mm. The diameter of the fiber is in the range of 0.1 to 30 μm and preferably in the range of 0.5 to 25 μm.

The form of the glass fiber is not particularly limited and fibers of various forms, such as lobing, milled fibers, chopped strands and the like, can be used. The glass fiber may be used singly or as a combination of two or more kinds.

The glass material may be treated by surface treatments with various agents, such as silane coupling agents like aminosilane coupling agents, epoxysilane coupling agents, vinylsilane coupling agents, methacrylsilane coupling agents and the like, and complex compounds of chromium, boron compounds and the like, for the purpose of enhancing the affinity with the resin.

As the glass material, commercial materials, such as MA-409C (average diameter of fiber, 13 μm) and TA-409C (average diameter of fiber, 23 μm) both produced by Asahi Glass Co., Ltd., can be favorably used.

The carbon fiber is a material produced by baking cellulose fiber, acrylic fiber, lignin, petroleum pitch or coal pitch as the material. Various types of carbon fiber, such as a flame resistant type, a carbon type, a graphite type and the like, can be used. The length of the carbon fiber is generally in the range of 0.01 to 10 μm and preferably in the range of 0.02 to 8 mm. Diameter of the carbon fiber is in the range of 1 to 15 μm and preferably in the range of 5 to 13 μm.

The form of the carbon fiber is not particularly limited and fibers of various forms, such as lobing, milled fibers, chopped strands, strands and the like, can be used. The carbon fiber may be used singly or as a combination of two or more kinds.

The carbon fiber may be treated by surface treatments with various agents, such as epoxy resin and polyurethane resins, for the purpose of enhancing the affinity with the resin.

As the carbon fiber, commercial materials, such as Besfite (average diameter of fiber, 7 μm), can be favorably used.

As the inorganic filler, other materials, such as aluminum fiber, calcium carbonate, magnesium carbonate, dolomite, silica, diatomaceous earth, alumina, iron oxides, zinc oxide, magnesium oxide, calcium sulfate, magnesium sulfate, calcium sulfite, talc, clay, mica, asbestos, calcium silicate, montmorillonite, bentonite, graphite, iron powder, lead powder, aluminum powder and the like, may be used.

When the inorganic filler is used as the component (B), PC which has been mentioned as the component (B) may be mixed into the resin composition additionally as the component (B).

In the resin composition comprising PC-PDMS copolymer as the component (A) and PC and inorganic filler as the component (B) described above, the resin composition comprises 1 to 99 weight %, preferably 2 to 95 weight %, of PC-PDMS copolymer as the component (A), 0 to 98 weight %, preferably 0 to 90 weight % of PC as a part of the component (B) and 1 to 60 weight %, preferably 5 to 55 weight %, of the inorganic filler as the other part of the component (B).

When the content of the inorganic filler as a part of the component (B) is less than 1 weight %, the increase of stiffness is insufficient. When the content is more than 60 weight %, mixing of the resin composition becomes difficult or impossible. Thus, contents out of the specific range are not preferable.

Still another of the resin composition of the present invention comprises the component (A) described above and a fluororesin as the component (B). The fluororesin of the component (B) is not particularly limited and any kind of resin containing fluorine atom in the molecule can be used.

Among such kinds of fluororesin, a resin having carbon-fluorine bond in the molecule, such as polytetrafluoroethylene, polychlorotrifluoroethylene, polyvinyl fluoride, polyvinylidene fluoride, hexafluoro-propylene-tetrafluoroethylene copolymers, chlorotrifluoro-ethylene-vinylidene fluoride copolymers and the like, are preferably used. Polytetrafluoroethylene having melting point in the range of 300° to 350° C. is particularly preferable among them. However, polytetrafluoroethylene having the ability of fibril formation is not preferable because mixing with the copolymer becomes difficult.

In the resin composition comprising PC-PDMS copolymer as the component (A) and the fluororesin as the component (B) described above, the resin composition comprises 1 to 99 weight %, preferably 40 to 98 weight %, of PC-PDMS as the component (A) and 99 to 1 weight %, preferably 60 to 2 weight %, of the fluororesin as the component (B). When the content of PD-PDMS as the component (A) is less than 1 weight %, flame resistance is inferior. When the content is more than 99 weight %, sliding property and solvent resistance are inferior.

Content of the polyorganosiloxane in the resin composition is 0.01 weight % or more. When the content of the polyorganosiloxane is less than 0.01 weight %, flame resistance does not reach 1/32 inch V-0.

Still another of the resin composition of the present invention, comprises the component (A) described above and pigment as the component (B). The pigment of the component (B) is not particularly limited.

For coating molded articles with white color, for example, titanium dioxide, zinc oxide, zinc sulfide, barium sulfide, lithopone, lead white or the like is used.

Titanium dioxide having superior coloring property is preferable among them. Any of futile type titanium dioxide and anatase type titanium dioxide can be used. However, the rutile type titanium dioxide having superior heat stability and weatherability is preferable. Titanium dioxide is more effectively applied when the surface of titanium dioxide is treated with a surface treatment agent of various kind and coated with the agent. Hydrated alumina, silica, zinc or the like is generally used as the treating agent.

For improvement of dispersion of titanium oxide in the resin composition, silicone oil, polyol or the like may be used.

For coloring molded articles black, carbon black is preferably used.

In the resin composition comprising PC-PDMS copolymer as the component (A) and pigment as the component (B) described above, the resin composition comprises 85 to 99.99 weight %, preferably 90 to 99.9 weight %, of PC-PDMS copolymer of the component (A) and 15 to 0.01 weight %, preferably 10 to 0.1 weight %, of the pigment of the component (B).

When the content of the pigment of the component (B) is less than 0.01 weight %, the effect of the coating or the effect of the coloring may be lost. When the content is more than 15 weight %, impact resistance is decreased. Thus, contents out of the specified range are not preferable.

Still another of the resin composition comprises the component (A) described above and a styrenic resin as the component (B). Examples of the styrenic resin are general purpose polystyrene resins (GPPS), high impact polystyrene resins (HIPS), styrene-maleic anhydride copolymers (GPSMA), high impact styrene-maleic anhydride copolymers (HISMA), acrylonitrile-styrene resins (AS), acrylonitrile-butadiene-styrene resins (ABS), syndiotactic polystyrene (SPS) and the like.

Specific examples of the general purpose polystyrene resin are polymers and copolymers of styrene, α-methylstyrene, p-methylstyrene, vinyltoluene, 2,4-dimethylstyrene, chlorostyrene and other substituted monovinyl aromatic monomers.

The high impact polystyrene resin is a polymer obtained by dissolving or mixing a rubbery elastomer into a monovinyl aromatic monomer and polymerizing the mixture. Specific examples of the rubbery elastomer are polybutadiene, styrene-butadiene-styrene rubber (SBS), styrene-butadiene rubber (SBR), butadiene-acrylic rubber, isoprene rubber, isoprene-styrene rubber, isoprene-acrylic rubber, ethylene-propylene rubber and the like. Polybutadiene is particularly preferable among them. As the polybutadiene, any of low cis polybutadiene (for example, containing 1 to 30 mol % of 1,2-vinyl linkage and 30 to 42 mol % of 1,4-cis linkage) and high cis polybutadiene (for example, containing 20 mol % or less of 1,2-vinyl linkage and 78 mol % or more of 1,4-cis linkage) or a mixture thereof can be used.

Contents of the two components in the styrene-maleic anhydride copolymer described above can be varied in a wide range. Molecular weight can be varied in a wide range, as well. The styrene-maleic anhydride copolymer can be prepared by reaction of maleic anhydride and styrene in the presence of a peroxide catalyst at an elevated temperature (U.S. Pat. Nos. 2,866,771 and 2,971,939). The styrene-maleic anhydride copolymer may comprise α-methylstyrene, vinyltoluene, 2,4-dimethylstyrene, chlorostyrene and other substituted styrenes in place of styrene itself. Molecular weight of the styrene-maleic anhydride copolymer can be varied in a wide range and is preferably in the range of 20,000 to 300,000 and preferably in the range of about 80,000 to 20,000.

The high impact styrene-maleic anhydride copolymer comprises maleic anhydride in the amount preferably in the range of 5 to 50 weight more preferably in the range of 5 to 30 weight % and particularly preferably in the range of 8 to 15 weight %. The high impact styrene-maleic anhydride copolymer described above is a polymer indicated by a product of thermal polymerization of styrene monomer and maleic anhydride with use of a rubber component in the presence of a chain transfer agent and a radical generator.

Representative examples of the rubber component described above are butadiene rubber, butadiene-styrene rubber and butadiene-acrylic rubber containing 60 to 95 weight % of butadiene, isoprene rubber, isopreno-styrene rubber and isoprene-acrylic rubber containing 60 to 95 weight % of isoprene, A-B type block rubbers and A-B-A type block rubbers of butadiene and styrene containing 60 to 95 weight % butadiene, ethylene-propylene copolymers (EPT) and the like. The rubber component is used singly or as a mixture of two kinds or more. It is preferred that the rubber component is contained in the finally obtained rubber modified copolymer resin in an amount of 2 to 25 weight % and preferably 5 to 12 weight %.

The high impact styrene-maleic anhydride copolymer may be a blend of GPSMA described above and a styrenic elastomer, such as SBR, SBS, MBS and the like.

The ABS resin is a graft polymer obtained by polymerizing two or more compounds selected from aromatic vinyl monomers, vinyl cyano monomers and monomers of alkyl esters of unsaturated carboxylic acids in the presence of conjugated diene rubbers by a conventional method, such as emulsion polymerization, bulk polymerization, bulk-suspension polymerization, emulsion-suspension polymerization and the like. This graft polymer may contain copolymers without grafting which are formed during the graft polymerization or copolymers of two or more kinds of compounds described above which have been prepared separately.

The composition of the ABS resin is not particularly limited. For providing the finally obtained polymer with valuable properties for practical applications, the ABS resin preferably contains 5 to 70 weight % of the conjugated diene rubber, 70 to 20 weight % of the aromatic vinyl monomers and 10 to 50 weight % of the vinylcyano monomer and/or the monomer of alkyl ester of unsaturated carboxylic acid.

The conjugated diene rubber constituting the ABS resin is polybutadiene, butadiene-styrene copolymer, butadiene-acrylonitrile copolymer, polyisoprene or the like. A combination of these compounds can be used without any problem. The aromatic vinyl monomer is styrene, α-methylstyrene, p-methylstyrene or the like. The vinylcyano monomer is acrylonitrile, methacrylonitrile or the like. The monomer of alkyl ester of unsaturated carboxylic acid is methyl acrylate, ethyl acrylate, methyl methacrylate, hydroxyethyl acrylate or the like.

In the resin composition comprising PC-PDMS copolymer of the component (A) and a styrenic resin of the component (B), the resin composition comprises 1 to 99 weight %, preferably 30 to 95 weight %, of PC-PDMS copolymer of the component (A) and 99 to 1 weight %, preferably 70 to 5 weight %, of the styrenic resin of the component (B).

When the content of PC-PDMS copolymer of the component (A) is less than 1 weight %, flame resistance is inferior. When the content is more than 99 weight %, the flow property is inferior and molding becomes difficult.

The content of the polyorganosiloxane in the resin composition is 0.01 weight % or more. When the content of the polyorganosiloxane is less than 0.01 weight %, flame resistance of the resin composition does not reach 1/16 inch V-0 and the content is not preferable.

Still another of the resin compositions of the present invention comprises the component (A) described above and polytetrafluoroethylene having the ability of fibril formation (fibril forming PTFE) as the component (B). The polytetrafluoroethylene having the ability of fibril formation of the component (B) is not particularly limited. For example, polytetrafluoroethylene classified into the type 3 of ASTM may be used. Specific examples of the polytetrafluoroethylene classified into the type 3 of ASTM are Teflon 6J produced by Du Pont-Mitsui Fluorochemicals Co., Ltd., Polyflon F-103 produced by Daikin Industries Co., Ltd. and the like. Examples of polytetrafluoroethylene not classified into the type 3 of ASTM are Algoflon F5 produced by Montefluos Corporation and the like.

The fibril forming PTFE described above can be obtained by polymerizing tetrafluoroethylene, for example, in the presence of sodium peroxydisulfide, potassium peroxydisulfide or ammonium peroxydisulfide at the pressure of 1 to 100 psi at the temperature of 0° to 200° C., preferably 20° to 100° C.

In the resin composition comprising PC-PDMS copolymer of the component (A) and fibril forming PTFE of the component (B), the resin composition comprises 0.01 to 2 weight parts, preferably 0.02 to 1.5 weight parts, of the fibril forming PTFE of the component (B) based on 100 weight parts of PC-PDMS copolymer of the component (A).

When the content of the fibril forming PTFE of the component (B) is less than 0.01 weight parts, the effect of enhancement of flame resistance is not exhibited. When the content is more than 2 weight parts, mixing of the fibril forming PTFE with PC-PDMS copolymer of the component (A) becomes difficult. Thus, contents out of the specified range are not preferable.

The content of the polyorganosiloxane in the resin composition is 0.01 weight % or more. When the content of the polyorganosiloxane is less than 0.01 weight %, flame resistance does not reach 1/32 inch V-0.

In the resin composition of the present invention, thermoplastic polyesters, polyamide resins, rubbery elastomers, polyolefin resins or other thermoplastic resins may be mixed in addition to the polycarbonate, the fluororesin, the styrenic resin or the polytetrafluoroethylene having the ability of fibril formation all described above.

Molded articles using PC-PDMS copolymer of the present invention can be obtained by molding PC-PDMS copolymer alone by a conventional molding method.

The molded articles of PC-PDMS copolymer is also obtained by preparing a resin composition by using PC-PDMS as the component (A) and various kinds of resin, inorganic filler or pigment as the component (B) and then molding the resin composition.

To PC-PDMS copolymer and the resin composition of the present invention, various kinds of additives can be added as the component (C) within the range that the object of the present invention is not adversely effected.

Examples of such additives are antioxidants, such as antioxidants of hindered phenol, antioxidants of ester of phosphorous acid, antioxidants of phosphoric acid and the like ultraviolet light absorbents, such as ultraviolet light absorbents of benzotriazole, ultraviolet light absorbents of benzophenone and the like, light stabilizers, such as light stabilizers of hindered amines and the like, internal lubricants, such as esters of aliphatic carboxylic acids, paraffin, silicone oils, polyethylene waxes and the like, flame retardants, flame retarding auxiliary agents, antistatic agents, coloring agents and the like.

The resin composition of the present invention can be obtained by compounding and mixing the component (A), the component (B) and, according to necessity, the component (C).

The compounding and mixing can be conducted according to conventional methods, for example, by using a ribbon blender, a Henshel mixer, a Bumbury mixer, a drum tumbler, a single axis screw extruder, a coaxial screw extrude, a cokneader, a multiaxis screw extruder and the like. Temperature of heating for mixing is selected generally in the range of 250° to 300° C.

PC-PDMS copolymer of the present invention alone or the resin composition of the present invention obtained as described above can be made into molded articles by using various kinds of conventional methods of molding, such as injection molding, blow molding, extrusion molding, compression molding, calender molding, rotation molding and the like.

Molded articles having sufficient flame resistance can be obtained from PC-PDMS copolymer of the present invention by using the tetrahalogenobisphenol or the polyhalogenobisphenol. Molded articles having sufficient flame resistance can also be obtained from the resin composition of the present invention because the resin composition comprises PC-PDMS copolymer to which flame resistance is provided by the tetrahalogenobisphenol or the polyhalogenobisphenol.

Further superior flame resistance can be provided to PC-PDMS copolymer and the resin composition of the present invention by additionally compounding a flame retardant.

Examples of the flame retardant used for providing further superior flame resistance are alkali metal salts or alkaline earth metal salts of suitable organic acids or inorganic acids and compounds containing halogen.

Examples of the preferable alkali metal salt of an inorganic acid are sodium salts, potassium salts, lithium salts and the like of an inorganic salt. Examples of the alkaline earth metal salt of an inorganic acid are calcium salts, magnesium salts and the like of an inorganic acid. Examples of the inorganic acid used for obtaining the alkali metal salt of an inorganic acid or the alkaline earth metal of an inorganic salt are $H_3AlF_6$, $H_3BF_6$, $H_3SbF_6$, $H_2TiF_6$, $H_2SiF_6$, $H_3PO_4$, $H_2ZrF_6$, $H_2WF_6$, $HBF_4$ and the like.

Preferable examples of the alkali metal salt of an inorganic acid and the alkaline earth metal salt of an inorganic acid are $Na_3AlF_6$, $Ca_3(AlF_6)_2$ and the like.

The preferable organic acid used for obtaining the alkali metal salt of an organic acid or the alkaline earth metal salt of an organic acid is an aliphatic sulfonic acid, an aromatic sulfonic acid, an aromatic carboxylic acid or an aliphatic carboxylic acid. Specific examples of the organic acid are trifluoromethanesulfonic acid, perfluorobutanesulfonic acid, perfluorooctanesulfonic acid, dodecanesulfonic acid, benzenesulfonic acid, 2,4,6-trichlorobenzenesulfonic acid, benzenedisulfonic acid, naphtholsulfonic acid, caprylic acid, lauric acid, benzoic acid, naphtholcarboxylic acid, 2,4,6-tribromobenzoic acid and the like. Preferable examples of the alkali metal salt of an organic acid and the alkaline earth metal salt of an organic acid are potassium perfluorobutanesulfonate, calcium perfluorobutanesulfonate and the like.

As the compound containing halogen, various compounds can be used. Representative examples of such compound are (1) low molecular weight polycarbonates containing tetrahalogenobisphenols, (2) epoxy resins containing tetrahalogenobisphenols and (3) other flame retardants containing halogen.

The flame retardants belonging to (1) or (2) described above are particularly preferable among them.

The low molecular weight polycarbonate containing tetrahalogenobisphenols is a low molecular weight polycarbonate (a polycarbonate oligomer) constituted with p of a repeating unit (X) represented by the following general formula:

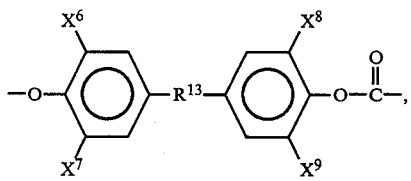

wherein $X^6$ to $X^9$ are, respectively, a halogen atom, $R^{13}$ is an alkylene group having 2 to 8 carbon atoms, an alkylidene group having 1 to 9 carbon atoms, a carbonyl group, a sulfon group, a sulfur atom or an oxygen atom, and q of a repeating unit (Y) represented by the following general formula:

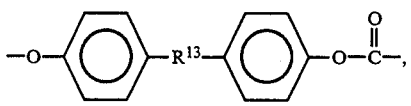

$R^{13}$ is the same as that described above, and containing 30 weight % or more of halogen. In the above, p is an integer of 1 to 30, q is an integer of 0 to 30 and p+q is an integer of 1 to 50, preferably 3 to 20.

Examples of the bisphenol compound containing halogen which constitutes the repeating unit (X) are 2,2-bis(3,5-dibromo-4-hydroxyphenyl)propane; 2,2-bis(3,5-dichloro-4-hydroxyphenyl)propane; bis(3,5-dibromo-4-hydroxyphenyl)methane; bis(3,5-dibromo-4-hydroxyphenyl) ether; bis(3,5-dibromo-4-hydroxyphenyl) sulfone and the like. Particularly, 2,2-bis(3,5-dibromo-4-hydroxyphenyl)propane which is generally called tetrabromobisphenol A is effective among them.

Examples of the bisphenol compound which constitutes the repeating unit (Y) are 2,2-bis(4-hydroxyphenyl)propane; 2,2-bis(4-hydroxyphenyl)methane; bis(4-hydroxyphenyl)sulfone; bis(4-hydroxyphenyl) ether and the like. Particularly, 2,2-bis(4-hydroxyphenyl)-propane which is generally called bisphenol A is effective among them.

Next, (2) the epoxy resin containing tetrahalogenobisphenol A is a polymer represented by the following general formula:

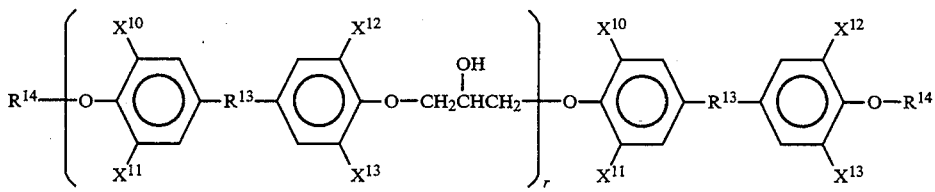

wherein $R^{13}$ is the same as that described above, $R^{14}$ is a hydrogen atom, methyl group, epoxypropyl group, phenyl group, 2-hydroxypropyl group or an oxygen atom, $X^{10}$ to $X^{13}$ are, respectively, a halogen atom and r is an integer of 1 to 30, and containing 30 weight % or more of halogen.

Examples of (3) the other flame retardant containing halogen are: halogenated aromatic compounds, such as tetrabromobenzene, tetrachlorobenzene, hexabromobenzene, hexachlorobenzene, hexabromobiphenyl, octabromobiphenyl; 2,2'-dichlorobiphenyl; 2,4'-dibromobiphenyl; 2,4'-dichlorobiphenyl, hexabromobiphenyl, triphenyl chloride; tetrachlorophthalic acid, tetrachlorophthalic anhydride, tetrabromophthalic acid, tetrabromophthalic anhydride, tribromophenol and the like other generally known halogenated aromatic compounds; diaromatic compounds, such as 2,2-bis(3,5-dichlorophenyl)propane; bis(2-chlorophenyl)methane; bis(2,6-dibromophenyl)methane; 1,2-bis(2,6-dichlorophenyl)ethane; 1,1-bis(2-chloro-4-methylphenyl)ethane; 1,1-bis(3,5-dichlorophenyl)ethane; 2,2-bis(3-phenyl-4-bromophenyl)ethane; 2,3-bis(4,6-dichloronaphthyl)propane; 2,2-bis(2,6-dichlorophenyl)pentane; 2,2-bis(2,6-dichlorophenyl)hexane; bis(4-chlorophenyl)methane; bis(3,5-dichlorophenyl)-cyclohexyl-methane; bis(3-nitro-4-bromophenyl)ethane; bis(4-hydroxy-2,6-dichloro-3-methoxyphenyl)methane; 2,2-bis(3,5-dichloro-4-hydroxyphenyl)propane; 2,2-bis(3,5-dibromo-4-hydroxyphenyl)propane; 2,2-bis(3-bromo-4-hydroxyphenyl)propane; 2,2-bis(3,5-dibromo-4-hydroxyphenyl)propane diglycidyl ether and the like other diaromatic compounds; and halogenated diphenyl ethers, particularly halogenated diphenyl ethers having 2 to 10 halogen atoms, such as decabromodiphenyl ether, octabromodiphenyl ether, hexabromodiphenyl ether, pentabromodiphenyl ether, tetrabromodiphenyl ether, tribromodiphenyl ether, dibromodiphenyl ether, hexachlorodiphenyl ether, pentachlorodiphenyl ether, tetrachlorodiphenyl ether, trichlorodiphenyl ether, dichlorodiphenyl ether and the like.

The invention will be described in more detail with reference to the following Examples of Preparation, Examples and Comparative Examples; however, these examples are intended to illustrate the invention and are not to be construed to limit the scope of the invention.

I. PC-PDMS Copolymers

Example of Preparation 1-1

[Preparation of polycarbonate oligomer A]

To 400 liter of a 5 weight % aqueous solution of sodium hydroxide, 60 kg of bisphenol A was dissolved to prepare an aqueous sodium hydroxide solution of bisphenol A.

Through a tubular reactor having 10 mm inner diameter and 10 m length, the aqueous sodium hydroxide solution of bisphenol A prepared above and kept at the room temperature and methylene chloride were passed at the speed of 138 liter/hr and 69 liter/hr, respectively, via an orifice plate. In parallel with these streams, phosgene was passed through the reactor at the speed of 10.7 kg/hr. The reaction was kept for 3 hours continuously. The tubular reactor had the structure of double tubes and cooling water was passed through the jacket part to keep the discharge temperature of the reacting solution at 25° C. The value of pH of the discharged solution was controlled in the range of 10 to 11.

The reaction solution thus obtained was left standing. Then, the separated water phase was removed and the methylene chloride phase (220 liter) was taken. To this methylene chloride phase, additional 170 liter of methylene chloride was added and stirred sufficiently to prepare polycarbonate oligomer A (concentration, 317 g/liter).

Polycarbonate oligomer A had degree of polymerization of 2 to 4 and concentration of chloroformate group of 0.7N.

Example of Preparation 1-2

[Preparation of polycarbonate oligomer B]

Into 14 liter of a 2.0N aqueous sodium hydroxide solution, 2.275 g (9.96 mol) of bisphenol A was dissolved. Into a vessel having an inner volume of 50 liter and equipped with a stirrer, the solution prepared here was charged and 8.25 liter of methylene chloride was added. While the solution was stirred at 50 rpm, phosgene was blown into the solution under cooling at the speed of 0.2 mol/minute for 70 minutes for reaction. After the addition of phosgene was stopped, the solution was stirred for further 30 minutes.

Then, a solution prepared by dissolving 250 g (0.46 mol) of tetrabromobisphenol A and 150 g (0.453 mol) of tribromophenol into an aqueous solution of sodium hydroxide (NaOH, 78.6 g; water, 1.35 liter) was added to the solution prepared above under continued stirring and, after adding 1.8 cc of triethylamine, the reaction was allowed to proceed for 60 minutes under stirring at 450 rpm.

After the reaction, the reaction product was left standing for about 30 minutes and an organic phase was obtained after removing an aqueous phase. Thus, polycarbonate oligomer B (concentration, 500 g/liter; concentration of chloroformate group, 0.5 mol/liter) was prepared.

Example of Preparation 2-1

[Synthesis of reactive PDMS-A]

Octamethylcyclotetrasiloxane in an amount of 1483 g, 96 g of 1,1,3,3-tetramethyldisiloxane and 35 g of 86% sulfuric acid were mixed together and the mixture was stirred for 17 hour at the room temperature. Then, the oil phase was separated, 25 g of sodium hydrogen carbonate was added to the separated oil phase and the mixture was stirred for 1 hour. After filtration, the treated reaction solution was distilled in vacuum of 3 torr at 150° C. to remove low boiling point components and an oil was obtained.

To a mixture of 60 g of 2-allylphenol and 0.0014 g of platinum in the form of a complex compound of platinum chloride and an alcoholate, 294 g of the oil obtained above was added at the temperature of 90° C. The mixture was stirred for 3 hours while it was kept at the temperature of 90° to 115° C. The reaction product was extracted with methylene chloride and the extract was washed with 80% of an aqueous methanol 3 times to remove excess amount of 2-allylphenol. The product was dried with anhydrous sodium sulfate and then the solvent was removed in vacuum by heating up to the temperature of 115° C.

The PDMS terminated with phenol had 30 repeating units of dimethylsilanoxy group according to NMR measurement.

Example of Preparation 2-2

[Synthesis of reactive PDMS-B]

The same operation was conducted as in Example of Preparation 2-1 except that 18.1 g of 1,1,3,3-tetramethyldisiloxane was used in place of 96 g of 1,1,3,3-tetramethyldisiloxane in Example of Preparation 2-1.

The PDMS terminated with phenol had 150 repeating units of dimethylsilanoxy group according to NMR measurement.

Example of Preparation 2-3

[Synthesis of reactive PDMS-C]

The same operation was conducted as in Example of Preparation 2-1 except that 7.72 g of 1,1,3,3-tetramethyldisiloxane was used in place of 96 g of 1,1,3,3-tetramethyldisiloxane in Example of Preparation 2-1.

The PDMS terminated with phenol had 350 repeating units of dimethylsilanoxy group according to NMR measurement.

Example 1A

[Preparation of PC-PDMS copolymer A]

Into a vessel having an inner volume of 50 liters and equipped with a stirrer, a solution prepared by mixing and dissolving 10 liter of polycarbonate oligomer A (bisphenol A unit, 11.6 mol) and 40 g of reactive PDMS-A and a solution of 330 g (0.61 g) of tetrabromobisphenol A and 169 g (0.51 mol) of tribromophenol dissolved in an aqueous solution of sodium hydroxide (NaOH, 110 g; water, 1.35 liter) were charged and mixed together. Triethylamine in an amount of 2.9 cc was added to it and the mixture was stirred For 60 minutes at 300 rpm for reaction.

After finishing the reaction, a solution of 500 g of bisphenol A dissolved in an aqueous solution of sodium hydroxide (NaOH, 290 g; water, 3.42 liters) was mixed with the reaction system described above. Then, 6.1 liters of methylene chloride was added to the solution and stirred for 60 minutes at 450 rpm for reaction.

After the reaction was finished, the organic phase and the aqueous phase were separated and the organic phase was washed with an alkali (0.01N-NaOH), an acid (0.1N-HCl) and water, successively and separated.

Methylene chloride was removed from the solution and PC-PDMS copolymer A of flake form was obtained.

Example 2A

[Preparation of PC-PDMS copolymer B]

By the same method as in Example 1A except that 160 g of reactive PDMS-A was used in place of 40 g of reactive PDMS-A in Example 1A, PC-PDMS copolymer B of flake form was obtained.

Example 3A

[Preparation of PC-PDMS copolymer C]

By the same method as in Example 1A except that 185 g (0.57 mol) of tribromophenol was used in place of 169 g of tribromophenol in Example 1A, PC-PDMS copolymer C of flake form was obtained.

Example 4A

[Preparation of PC-PDMS copolymer D]

PC oligomer B described above and reactive PDMS-A described above were brought into reaction with each other according to the flow of production shown in FIG. 2.

A 5 weight % methylene chloride solution of PC oligomer B and reactive PDMS-A, a 1 weight % aqueous solution of triethylamine (TEA) and a 25 weight % aqueous solution of sodium hydroxide (NaOH) were used. Flow speeds of the respective components were: PC oligomer B, 13 liter/hour; reactive PDMS, 4 liter/hour; TEA, 0.3 liter/hour; and NaOH, 0.23 liter/hour.

Pipeline Homomixers (a product of Tokushu Kika Kogyo Co., Ltd., 2SL type; inner volume, 0.3 liter; diameter of the first turbine blade, 42.5 mm; diameter of the second turbine blade, 48 mm) were used for both of the mixer and the reactor. Rotation speed in the mixer was 500 rpm and rotation speed in the reactor was 3000 rpm. As the main piping (the line for PC oligomer), a pipe having an inner diameter of 16 mm was used. TEA was charged at the location separated by 60 cm from the mixer. NaOH was charged at the location separated by 80 cm from the mixer. Temperature of the reactor was 25 to 30° C.

The reaction product obtained (containing PC-PDMS copolymerized oligomer) was left standing and separated. The organic phase in an amount of 330 cc was transferred to a 1 liter batch reactor and 120 cc of methylene chloride and 2.2 g of tert-butylphenol were added to it. The mixture was stirred to make a homogeneous mixture. To this solution, an alkaline aqueous solution of bisphenol A (bisphenol A, 19 g; sodium hydroxide, 11 g; and water, 130 cc) was added and the mixture was allowed to react for 1 hour under stirring of 500 rpm.

After the reaction, the reaction mixture was transferred to a 7 liter washing vessel and added with 400 cc of methylene chloride and 400 cc of water and then the organic phase and the aqueous phase were separated. After the separation, the organic phase was washed with an alkali (0.01N-NaOH), an acid (0.1N-HCl) and water, successively. After removing methylene chloride, PC-PDMS copolymer D of flake form was obtained.

Example 5A

[Preparation of PC-PDMS copolymer E]

By the same method as in Example 1A except that 20 g of reactive PDMS-A was used in place of 40 g of reactive PDMS-A in Example 1A, PC-PDMS copolymer E of flake form was obtained.

Example 6A

[Preparation of PC-PDMS copolymer F]

By the same method as in Example 4A except that flow speed of the 5 weight % methylene chloride solution of reactive PDMS-A was made 0.8 liter/hour in place of 4 liter/hour in Example 4A, PC-PDMS copolymer F of flake form was obtained.

Example 7A

[Preparation of PC-PDMS copolymer G]

By the same method as in Example 1A except that 4 g of reactive PDMS-A was used in place of 40 g of reactive PDMS-A in Example 1A, PC-PDMS copolymer G of flake form was obtained.

Example 8A

[Preparation of PC-PDMS copolymer H]

By the same method as in Example 1A except that 8 g of reactive PDMS-A was used in place of 40 g in Example 1A and 195 g (0.358 mol) of tetrabromobisphenol A was used in place of 330 g of reactive PDMS-A in Example 1A, PC-PDMS copolymer H of flake form was obtained.

Example 9A

[Preparation of PC-PDMS copolymer I]

Into a vessel having an inner volume of 50 liter and equipped with a stirrer, a solution prepared by mixing and dissolving 10 liter of PC oligomer A (bisphenol A unit, 11.6 mol) and 8 g of reactive PDMS-B and a solution of 195 g (0.358 mol) of tetrabromobisphenol A and 169 g (0.51 mol) of tribromophenol dissolved in an aqueous solution of sodium hydroxide (NaOH, 110 g; water, 1.35 liters) were charged and mixed together. Triethylamine in an amount of 2.9 cc was added to it and the mixture was stirred for 60 minutes at 300 rpm for reaction.

After finishing the reaction, a solution of 500 g of bisphenol A dissolved in an aqueous solution of sodium hydroxide (NaOH, 290 g; water, 3.42 liters) was mixed with the reaction system described above. Then, 6.1 liter of methylene chloride was added to the solution and stirred for 60 minutes at 450 rpm for reaction.

After the reaction was finished, the organic phase and the aqueous phase were separated and the organic phase was washed with an alkali (0.01N-NaOH), an acid (0.1N-HCl) and water, successively and separated.

Methylene chloride was removed from the solution and PC-PDMS copolymer I of flake form was obtained.

Example 10A

[Preparation of PC-PDMS copolymer J]

By the same method as in Example 9A except that reactive P-DMSC was used in place of reactive PDMS-B in Example 9A, PC-PDMS copolymer J of flake form was obtained.

Example 11A

[Preparation of PC-PDMS copolymer K]

By the same method as in Example 9A except that 40 g of reactive PDMS-B was used in place of 8 g of reactive PDMS-B in Example 9A and 330 g (0.61 mol) of tetrabromobisphenol A was used in place of 195 of tetrabromobisphenol A in Example 9A, PC-PDMS copolymer K of flake form was obtained.

Comparative Example 1A

[Preparation of PC-PDMS copolymer L]

By the same method as in Example 1A except that reactive PDMSA was not used, PC-PDMS copolymer L of flake form was obtained.

Comparative Example 2A

[Preparation of PC-PDMS copolymer M]

By the same method as in Example 1A except that 77 g of p-tert-butylphenol was used in place of 169 g of tribromophenol in Example 1A, PC-PDMS copolymer M of flake form was obtained.

Comparative Example 3A

[Preparation of PC-PDMS copolymer N]

By the same method as in Example 1A except that 38 g of tetrabromobisphenol A was used in place of 330 g of tetrabromobisphenol A in Example 1A and 40 g of sodium hydroxide was used in place of 110 g of sodium hydroxide in Example 1A, PC-PDMS copolymer N of flake form was obtained.

Comparative Example 4A

[Preparation of PC-PDMS copolymer O]

By the same method as in Example 1A except that reactive PDMSB was used in place of reactive PDMS-A in Example 1A, PC-PDMS copolymer O of flake form was obtained.

Comparative Example 5A

[Preparation of PC-PDMS copolymer P]

By the same method as in Example 1A except that 0.2 g of reactive PDMS-A was used in place of 40 g of reactive PDMSoA in Example 1A, PC-PDMS copolymer P of flake form was obtained.

Comparative Example 6A

[Preparation of PC-PDMS copolymer Q]

By the same method as in Example 9A except that 0.2 g of reactive PDMS-B was used in place of 8 g of reactive PDMS-B in Example 1A, PCPDMS copolymer Q of flake form was obtained.

PC-PDMS copolymers A to Q obtained in Examples 1A to 11A and Comparative Examples 1A to 6A were, respectively, dried at 120° C. for one day and one night, pelletized by an extruder of 280° C. and molded at 280° C.

Before the pelletizing, 800 ppm of trisnonylphenyl phosphite was added as the antioxidant to PC-PDMS copolymers E, F, G, I, K and L.

Viscosity average molecular weight and glass transition temperature (Tg) were measured for evaluation of physical properties of PC-PDMS copolymers A to Q obtained in Examples 1A to 11A and Comparative Examples 1A to 6A. Results of the measurements are shown in Table 1A.

The measurements were conducted according to the following methods.

*1: Content of TBA

Content of TBA was obtained from ratio of intensities of aromatic protons of the bisphenol A group observed at 7.1 to 7.3 ppm and aromatic protons of the TBA group observed at 7.43 ppm in $^1$H-NMR.

*2: Content of PDMS

Content of PDMS was obtained from ratio of intensities of aromatic protons of the bisphenol A group observed at 7.1 to 7.3 ppm, aromatic protons of the TBA group observed at 7.43 ppm and methyl protons of PDMS observed at 0.11 ppm in $^1$H-NMR.

*3: Bromine content (total bromine in the total copolymer)

Bromine content was obtained by Volhard method after decomposition of a sample by an alkali.

*4: Viscosity average molecular weight ($M_v$)

Intrinsic viscosity [$\eta$] was obtained by measurement of viscosity of methylene chloride solution at 20° C. by using an Ubelhode viscometer. Viscosity average molecular weight was calculated from the intrinsic viscosity by the following equation:

$$[\eta] = 1.23 \times 10^{-5} \times M_v^{0.83}$$

*5: Tg

Tg was obtained by measurement using DSC (Differential scanning calorimeter).

TABLE 1A

| | PC-PDMS copolymer | TBA*1 (mol %) | PDMS*2 (wt. %) | Bromine content*3 (wt. %) | Viscosity average molecular weight ($M_v$)*4 | Tg*5 (°C.) |
|---|---|---|---|---|---|---|
| Example 1A | A | 4.0 | 1.1 | 7.9 | 20,500 | 153 |
| Example 2A | B | 4.0 | 3.8 | 7.7 | 20,500 | 152 |
| Example 3A | C | 3.9 | 1.3 | 8.2 | 19,000 | 153 |
| Example 4A | D | 4.1 | 1.0 | 8.0 | 19,000 | 153 |
| Example 5A | E | 4.1 | 0.5 | 8.0 | 20,600 | 153 |
| Example 6A | F | 4.1 | 0.2 | 8.0 | 19,000 | 153 |
| Example 7A | G | 4.1 | 0.1 | 8.0 | 20,400 | 153 |
| Example 8A | H | 2.4 | 0.2 | 6.0 | 20,500 | 153 |
| Example 9A | I | 2.4 | 0.2 | 6.0 | 20,600 | 153 |
| Example 10A | J | 2.4 | 0.2 | 6.0 | 20,700 | 153 |
| Example 11A | K | 4.0 | 1.1 | 7.9 | 20,500 | 153 |
| Comparative Example 1A | L | 4.0 | — | 8.0 | 20,500 | 154 |
| Comparative Example 2A | M | 3.8 | 1.0 | 4.7 | 20,400 | 152 |
| Comparative Example 3A | N | 0.5 | 1.3 | 3.5 | 21,000 | 152 |
| Comparative Example 4A | O | 4.0 | 1.1 | 7.8 | 20,500 | 152 |
| Comparative Example 5A | P | 4.0 | 0.005* | 7.9 | 20,500 | 153 |
| Comparative Example 6A | Q | 2.4 | 0.005* | 6.0 | 20.500 | 153 |

Figure 3B:
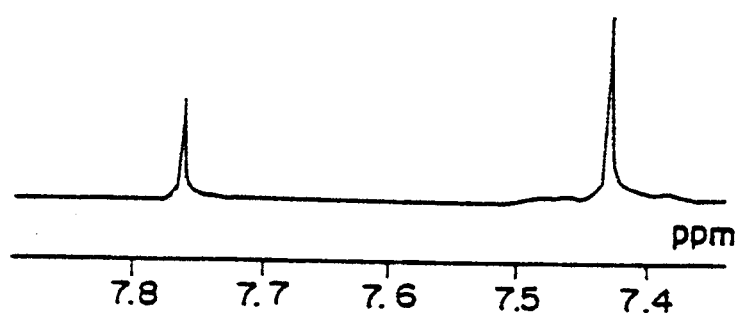
Figure 3C:
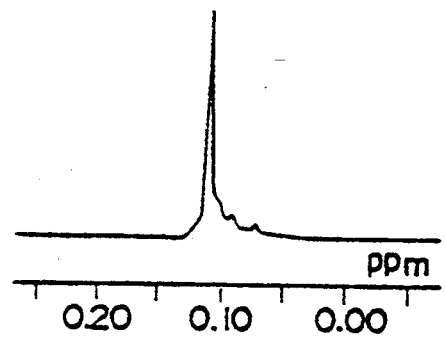
Figure 4:
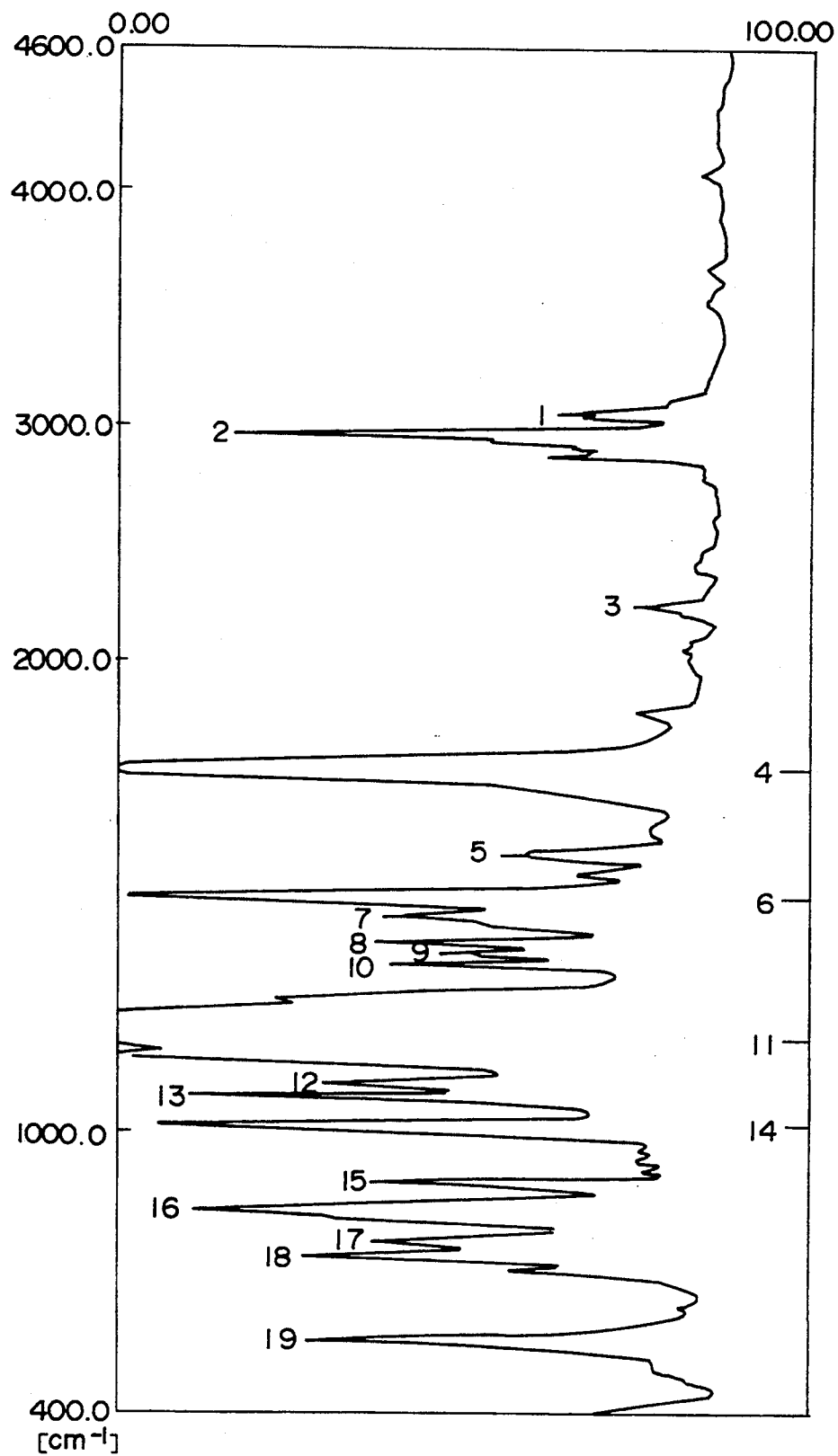
FIG. 4 shows an infrared spectrum of polycarbonatepolyorganosiloxane copolymer A obtained in Example 1.

*: Calculated from the amounts of charged materials.
The chart of $^1$H-NMR (a deuterochloroform solution) of PC-PDMS copolymer A obtained in Example 1A is shown in FIGS. 3A, 3B, and 3C and the chart of infrared absorption spectrum (a cast film) of the same copolymer is shown in FIG. 4.
Flame resistance, Izod impact strength and haze were measured for evaluation of quality of molded products of PC-PDMS copolymers A to Q obtained in Examples 1A to 11A and Comparative Examples 1A to 6A. Results of the measurements are shown in Table 2A.
The measurements were conducted according to the following methods.
*1: Flame resistance
Flame resistance was evaluated according to the method of flame resistance test UL-94 1/32 inch (thickness). The vertical combustion test was conducted according to Underwriters Laboratory, Subject 94.
*2: Izod impact strength (with notch)
Izod impact strength was measured according to the method of Japanese Industrial Standard K-7110 by using a test piece of ⅛ inch thickness.
*3: Haze
Haze was measured according to the method of Japanese Industrial Standard K-7105 by using a test piece of 3 mm thickness.

The chart of $^1$H-NMR (a deuterochloroform solution) of PC-PDMS copolymer A obtained in Example 1A is shown in FIGS. 3A, 3B and 3C and the chart of infrared absorption spectrum (a cast film) of the same copolymer is shown in FIG. 4.

Flame resistance, Izod impact strength and haze were measured for evaluation of quality of molded products of PC-PDMS copolymers A to Q obtained in Examples 1A to 11A and Comparative Examples 1A to 6A. Results of the measurements are shown in Table 2A.

The measurements were conducted according to the following methods.

*1: Flame resistance

Flame resistance was evaluated according to the method of flame resistance test UL 94 1/32 inch (thickness). The vertical combustion test was conducted according to Underwriters Laboratory, Subject 94.

*2: Izod impact strength (with notch)

Izod impact strength was measured according to the method of Japanese Industrial Standard K-7110 by using a test piece of ⅛ inch thickness.

*3: Haze

Haze was measured according to the method of Japanese Industrial Standard K-7105 by using a test piece of 3 mm thickness.

TABLE 2A

| | Flame resistance (UL-94)*1 | Izod impact strength*2 23° C. (kJ/m²) | Izod impact strength*2 0° C. (kJ/m2) | Haze*3 (%) |
| --- | --- | --- | --- | --- |
| Example 1A | V-0 | 78 | 73 | 3 |
| Example 2A | V-0 | 86 | 79 | 4 |
| Example 3A | V-0 | 79 | 75 | 3 |
| Example 4A | V-0 | 80 | 76 | 3 |
| Example 5A | V-0 | 78 | 72 | 3 |
| Example 6A | V-0 | 74 | 70 | 2 |
| Example 7A | V-0 | 70 | 68 | 2 |
| Example 8A | V-0 | 75 | 71 | 2 |
| Example 9A | V-0 | 74 | 72* | — |
| Example 10A | V-0 | 71 | 74* | — |
| Example 11A | V-0 | 70 | 76* | — |
| Comparative Example 1A | V-2 | 75 | 22 | 3 |
| Comparative Example 2A | V-2 | 77 | 70 | 4 |
| Comparative Example 3A | V-2 | 76 | 71 | 3 |
| Comparative Example 4A | V-0 | 79 | 74 | 92 |
| Comparative Example 5A | V-2 | 76 | 22 | 3 |
| Comparative Example 6A | V-2 | 75 | 14* | — |

*: Izod impact strength at −10° C.

II. PC-PDMS Copolymers and Resin Compositions Comprising PC

PC-PDMS copolymers, A, B, D and H described above and PC-PDMS copolymer R were used as PC-PDMS copolymers.

PC-PDMS copolymer R described above was prepared as following.

Into a vessel having an inner volume of 50 liter and equipped with a stirrer, a solution prepared by mixing and dissolving 10 liter of PC oligomer A (bisphenol A unit, 11.6 mol) described above and 700 g of the reactive PDMS-A described above and a solution of 330 g (0.61 mol) of tetrabromobisphenol A and 169 g (0.51 mol) of tribromophenol dissolved in an aqueous solution of sodium hydroxide (NaOH, 110 g; water, 1.35 liter) were charged and mixed together. Triethylamine in an amount of 2.9 cc was added to it and the mixture was stirred for 60 minutes at 300 rpm for reaction.

After finishing the reaction, a solution of 500 g of bisphenol A dissolved in an aqueous solution of sodium hydroxide (NaOH, 290 g; water, 3.42 liters) was mixed with the reaction system described above. Then, 6.1 liters of methylene chloride was added to the solution and stirred for 60 minutes at 450 rpm for reaction.

After the reaction was finished, the organic phase and the aqueous phase were separated and the organic phase was washed with an alkali (0.01N-NaOH), an acid (0.1N-HCl) and water, successively and separated.

Methylene chloride was removed from the solution and PC-PDMS copolymer R of flake form was obtained. The polymer obtained had the following properties:

Content of PDMS: 15.0 weight %; bromine content: 6.8 weight %;

Viscosity average molecular weight: 21,000

For comparison, polycarbonates containing halogen, PC-1 and PC-2, both prepared as described in the following, and polycarbonates not containing halogen, PC-3 and PC-4, both commercial products as described in the following, were used.

(1) PC-1

Into a vessel having an inner volume of 50 liter and equipped with a stirrer, 10 liter of PC oligomer A described above (bisphenol A unit, 11.6 mol) and a solution of 330 g (0.61 mol) of tetrabromobisphenol A and 169 g (0.51 mol) of tribromophenol dissolved in an aqueous solution of sodium hydroxide (NaOH, 110 g; water, 1.35 liters) were mixed together. Then, 2.9 cc of triethylamine was added to the mixture and stirred for 60 minutes at 300 rpm for reaction.

After the reaction was finished, a solution of 500 g of bisphenol A dissolved in an aqueous solution of sodium hydroxide (NaOH, 290 g; water, 3.42 liters) was mixed to the reaction system described above. To this mixture, 6.1 liters of methylene chloride was added and stirred for 60 minutes at 450 rpm for reaction.

After the reaction, the organic phase and the aqueous layer were separated. The organic phase was washed with an alkali (0.01N-NaOH), an acid (0.1N-HCl) and water, successively, and separated. Methylene chloride was removed from the solution and PC-1 of flake form was obtained. PC-1 obtained had bromine content of 8.0 weight % and viscosity average molecular weight of 20,500.

(2) PC-2

By the same operation as in the preparation of PC-1 described above except that 77 g of p-tert-butylphenol was used in place of 169 g of tribromophenol in the preparation of PC-1, PC-2 of flake form was obtained. PC-2 obtained had bromine content of 4.7 weight % and viscosity average molecular weight of 20,400.

(3) PC-3

Toughlon A 2200 (a product of Idemitsu Petrochemical Co., Ltd.; $M_v$: 21,500)

(4) PC-4

Toughlon IB 2500 (a product of Idemitsu Petrochemical Co., Ltd.; $M_v$: 25,500; a branched type) Examples 1B to 10B and Comparative Examples 1B to 4B By using PC-PDMS copolymers A, B, D, H, and R described above and the polycarbonates PC-1, PC-2, PC-3 and PC-4, materials were compounded by dry blending in the ratio shown in Table 1B, mixed at 270° C. and pelletized.

The pellets thus obtained were dried at 120° C. for 12 hours and molded by injection to obtain test pieces.

Flame resistance, Izod impact resistance and haze of the test pieces thus obtained were measured for evaluation of quality. Results are shown in Table 2B.

TABLE 1B

| | PC-PDMS copolymer | | Polycarbonate | | Content of PDMS*1 | Bromine content*1 |
|---|---|---|---|---|---|---|
| | kind | content (wt. %) | kind | content (wt. %) | (wt. %) | (wt. %) |
| Example 1B | A | 50 | PC-1 | 50 | 0.55 | 7.95 |
| Example 2B | A | 20 | PC-1 | 80 | 0.22 | 7.98 |
| Example 3B | A | 10 | PC-1 | 90 | 0.11 | 7.98 |
| Example 4B | B | 5 | PC-1 | 95 | 0.19 | 7.99 |
| Example 5B | D | 20 | PC-1 | 80 | 0.22 | 8.00 |
| Example 6B | A | 80 | PC-3 | 20 | 0.88 | 6.32 |
| Example 7B | A | 20 | PC-2 | 80 | 0.22 | 5.34 |
| Example 8B | R | 1.3 | PC-1 | 98.7 | 0.20 | 7.98 |
| Example 9B | A | 80 | PC-4 | 20 | 0.88 | 6.32 |
| Example 10B | H | 90 | PC-3 | 10 | 0.18 | 5.40 |
| Comparative Example 1B | — | — | PC-1 | 100 | 0*2 | 8.0*2 |
| Comparative Example 2B | — | — | PC-2 | 100 | 0*2 | 4.7*2 |
| Comparative Example 3B | — | — | PC-3 | 100 | 0*2 | 0*2 |
| Comparative Example 4B | — | — | PC-4 | 100 | 0*2 | 0*2 |

*1: Calculated value.
*2: Observed value.

TABLE 2B

| | Flame resistance (UL-94) | Izod impact strength 23° C. (kJ/m$^2$) | Izod impact strength 0° C. (kJ/m$^2$) | Haze (%) |
|---|---|---|---|---|
| Example 1B | V-0 | 77 | 74 | 3 |
| Example 2B | V-0 | 76 | 74 | 2 |
| Example 3B | V-0 | 75 | 73 | 2 |
| Example 4B | V-0 | 75 | 72 | 3 |
| Example 5B | V-0 | 76 | 74 | 2 |
| Example 6B | V-0 | 79 | 77 | 3 |
| Example 7B | V-0 | 76 | 74 | 2 |
| Example 8B | V-0 | 76 | 74 | 2 |
| Example 9B | V-0 | 77 | 75 | 2 |
| Example 10B | V-0 | 75 | 72 | 2 |
| Comparative Example 1B | V-2 | 75 | 22 | 3 |
| Comparative Example 2B | V-2 | 73 | 20 | 3 |
| Comparative Example 3B | lower than V-2 | 78 | 75 | 2 |
| Comparative Example 4B | lower than V-2 | 79 | 76 | 2 |

III. Resin compositions comprising PC-PDMS copolymers, PC and inorganic fillers

PC-PDMS copolymers A, B, D, E and H described above and PC-PDMS copolymers S and T were used as PC-PDMS copolymers.

PC-PDMS copolymers S and T were prepared as following.

(1) PC-PDMS copolymer S

Into a vessel having an inner volume of 50 liter and equipped with a stirrer, a solution prepared by mixing and dissolving 10 liter of PC oligomer A (bisphenol A unit, 11.6 mol) described above and 700 g of the reactive PDMS-B described above and a solution of 330 g (0.61 mol) of tetrabromobisphenol A and 169 g (0.51 mol) of tribromophenol dissolved in an aqueous solution of sodium hydroxide (NaOH, 110 g; water, 1.35 liter) were charged and mixed together. Triethylamine in an amount of 2.9 cc was added to it and the mixture was stirred for 60 minutes at 300 rpm for reaction.

After finishing the reaction, a solution of 500 g of bisphenol A dissolved in an aqueous solution sodium hydroxide (NaOH, 290 g; water, 3.42 liters) was mixed with the reaction system described above. Then, 6.1 liters of methylene chloride was added to the solution and stirred for 60 minutes at 450 rpm for reaction.

After the reaction was finished, the organic phase and the aqueous phase were separated and the organic phase was washed with an alkali (0.01N-NaOH), an acid (0.1N-HCl) and water, successively and separated. Methylene chloride was removed from the solution and PC-PDMS copolymer S of flake form was obtained. PC-PDMS copolymer S obtained had the following properties:

Content of PDMS: 1.1 weight %; bromine content: 7.9 weight %;

Viscosity average molecular weight: 20,600.

(2) PC-PDMS copolymer T

By the same method as in the preparation of PC-PDMS copolymer S except that reactive PDMS-C was used in place of reactive PDMS-B in the preparation of PDMS copolymer S, PC-PDMS copolymer T of flake form was obtained. PC-PDMS copolymer T obtained had the following properties:

Content of PDMS: 1.1 weight %; bromine content: 7.9 weight %;

Viscosity average molecular weight: 20,900.

For comparison, the polycarbonates containing halogen PC-1 and PC-2 and the polycarbonates not containing halogen PC-3 and PC-4 were used.

Examples 1C to 17C and Comparative Examples 1C to 10C

By using PC-PDMS copolymers A, B, D, E, H, S and T described above, the polycarbonates PC-1, PC-2, PC-3 and PC-4 and an inorganic filler, materials were compounded by dry blending in the ratio shown in Table 1C, mixed at 270° C. and pelletized. The inorganic filler was charged at a position down stream of a hopper from which the material resins were charged.

The pellets thus obtained were dried at 120° C. for 12 hours and molded by injection to obtain test pieces.

Tensile strength, Izod impact resistance, flame resistance and flow value of the test pieces thus obtained were measured for evaluation of quality. Results are shown in Table 2C.

The inorganic fillers used here are as following:

C$_1$: Glass fiber (a product of Asahi Fiber Glass Co., Ltd., MA-409C)

C$_2$: Glass beads (a product of Toshiba-Ballotini Co., Ltd., EGB-731A)

$C_3$: Carbon fiber (a product of Toho Rayon Co., Ltd., HTA-C6-SRS)

$C_4$: Talc, average diameter of 0.9 μm $C_5$: Calcium carbonate (a product of Shiraishi Kogyo Kaisha, Ltd., Vigot-10)

Measurements were conducted as following:

1: Tensile strength

Tensile strength was measured according to the method of Japanese Industrial Standard K-7113.

2: Izod impact strength (with notch)

Izod impact strength was measured according to the method of Japanese Industrial Standard K-7110 by using a test piece of ⅛ inch thickness.

3: Flame resistance

Flame resistance was evaluated according to the method of flame resistance test of Underwriters Laboratory Subject 94 (UL-94), the vertical combustion test, with 1/16 inch thickness or 1/32 inch thickness.

4: Flow value

Flow value was measured according to the method of Japanese Industrial Standard K-7210.

TABLE 1C

| | PC-PDMS copolymer | | Polycarbonate | | Inorganic filler | |
|---|---|---|---|---|---|---|
| | kind | content (wt. %) | kind | content (wt. %) | kind | content (wt. %) |
| Example 1C | A | 10 | PC-3 | 60 | $C_1$ | 30 |
| Example 2C | B | 10 | PC-3 | 60 | $C_1$ | 30 |
| Example 3C | D | 10 | PC-3 | 60 | $C_1$ | 30 |
| Example 4C | E | 10 | PC-3 | 60 | $C_1$ | 30 |
| Example 5C | H | 10 | PC-3 | 60 | $C_1$ | 30 |
| Example 6C | S | 10 | PC-3 | 60 | $C_1$ | 30 |
| Example 7C | T | 10 | PC-3 | 60 | $C_1$ | 30 |
| Example 8C | H | 70 | — | 0 | $C_1$ | 30 |
| Example 9C | H | 5 | PC-3 | 45 | $C_1$ | 50 |
| Example 10C | H | 5 | PC-3 | 45 | $C_1$ | 25 |
| | | | | | $C_2$ | 25 |
| Example 11C | H | 20 | PC-3 | 70 | $C_1$ | 10 |
| Example 12C | H | 10 | PC-1 | 60 | $C_1$ | 30 |
| Example 13C | If | 10 | PC-2 | 60 | $C_1$ | 30 |
| Example 14C | H | 10 | PC-4 | 60 | $C_1$ | 30 |
| Example 15C | A | 10 | PC-3 | 60 | $C_3$ | 30 |
| Example 16C | A | 20 | PC-3 | 70 | $C_4$ | 10 |
| Example 17C | B | 20 | PC-3 | 70 | $C_5$ | 10 |
| Comparative Example 1C | — | — | PC-1 | 70 | $C_1$ | 30 |
| Comparative Example 2C | — | — | PC-2 | 70 | $C_1$ | 30 |
| Comparative Example 3C | — | — | PC-3 | 70 | $C_1$ | 30 |
| Comparative Example 4C | — | — | PC-4 | 70 | $C_1$ | 3D |
| Comparative Example 5C | — | — | PC-1 | 50 | $C_1$ | 50 |
| Comparative Example 6C | — | — | PC-1 | 50 | $C_1$ | 25 |
| | | | | | $C_2$ | 25 |
| Comparative Example 7C | — | — | PC-1 | 90 | $C_1$ | 10 |
| Comparative Example 8C | — | — | PC-1 | 70 | $C_3$ | 30 |
| Comparative Example 9C | — | — | PC-1 | 90 | $C_4$ | 10 |
| Comparative Example 10C | — | — | PC-1 | 90 | $C_5$ | 10 |

TABLE 2C

| | Tensile strength (kg/cm²) | Izod impact strength (kg-cm/cm) | Flame resistance (UL-94) | | Flow value (ml/sec) |
|---|---|---|---|---|---|
| | | | 1/16" | 1/32" | |
| Example 1C | 1,200 | 16 | V-0 | V-0 | $4 \times 10^{-2}$ |
| Example 2C | 1,200 | 16 | V-0 | V-0 | $4 \times 10^{-2}$ |
| Example 3C | 1,200 | 16 | V-0 | V-0 | $5 \times 10^{-2}$ |
| Example 4C | 1,200 | 16 | V-0 | V-0 | $5 \times 10^{-2}$ |
| Example 5C | 1,200 | 16 | V-0 | V-0 | $5 \times 10^{-2}$ |
| Example 6C | 1,200 | 17 | V-0 | V-0 | $4 \times 10^{-2}$ |
| Example 7C | 1,200 | 16 | V-0 | V-0 | $4 \times 10^{-2}$ |
| Example 8C | 1,200 | 17 | V-0 | V-0 | $5 \times 10^{-2}$ |
| Example 9C | 1,350 | 15 | V-0 | V-0 | $2 \times 10^{-2}$ |
| Example 10C | 1,100 | 14 | V-0 | V-0 | $2 \times 10^{-2}$ |
| Example 11C | 800 | 9 | V-0 | V-0 | $6 \times 10^{-2}$ |
| Example 12C | 1,200 | 16 | V-0 | V-0 | $4 \times 10^{-2}$ |
| Example 13C | 1,200 | 16 | V-0 | V-0 | $4 \times 10^{-2}$ |
| Example 14C | 1,200 | 16 | V-0 | V-0 | $4 \times 10^{-2}$ |
| Example 15C | 1,300 | 6 | V-0 | V-0 | $6 \times 10^{-2}$ |
| Example 16C | 1,100 | 17 | V-0 | V-0 | $6 \times 10^{-2}$ |
| Example 17C | 1,100 | 18 | V-0 | V-0 | $6 \times 10^{-2}$ |
| Comparative Example 1C | 1,200 | 16 | V-0 | V-2 | $4 \times 10^{-2}$ |
| Comparative Example 2C | 1,200 | 16 | V-0 | V-2 | $4 \times 10^{-2}$ |
| Comparative Example 3C | 1,200 | 16 | V-2 | V-2 | $4 \times 10^{-2}$ |
| Comparative Example 4C | 1,200 | 16 | V-2 | V-2 | $3 \times 10^{-2}$ |
| Comparative Example 5C | 1,350 | 15 | V-0 | V-2 | $2 \times 10^{-2}$ |
| Comparative Example 6C | 1,100 | 14 | V-0 | V-2 | $2 \times 10^{-2}$ |
| Comparative Example 7C | 800 | 8 | V-0 | V-2 | $6 \times 10^{-2}$ |
| Comparative Example 8C | 1,200 | 7 | V-0 | V-2 | $4 \times 10^{-2}$ |
| Comparative Example 9C | 1,300 | 18 | V-0 | V-2 | $6 \times 10^{-2}$ |
| Comparative Example 10C | 1,100 | 20 | V-0 | V-2 | $6 \times 10^{-2}$ |

IV. Resin Compositions comprising PC-PDMS copolymers and pigments

Examples 1D to 22D and Comparative Examples 1D to 5D

By using PC-PDMS copolymers A, B, D, E, H, S and T described above, the polycarbonates PC-1, PC-2 and PC-3 and a pigment $F_1$, $F_2$, $F_3$ or $F_4$, materials were compounded by dry blending in the ratio shown in Table 1D, mixed at 270° C. and pelletized. The pellets thus obtained were dried at 120° C. for 12 hours and molded by injection to obtain test pieces.

Tensile strength, Izod impact resistance, flame resistance and low value of the test pieces thus obtained were measured for evaluation of quality. Results are shown in Table 2D.

The pigments used here are as following:

$F_1$: Titanium dioxide $F_2$: Zinc sulfide $F_3$: Carbon black $F_4$: Barium sulfate

TABLE 1D

| | PC-PDMS copolymer | | Polycarbonate | | Pigment | |
|---|---|---|---|---|---|---|
| | kind | content (wt. %) | kind | content (wt. %) | kind | content (wt. %) |
| Example 1D | A | 99 | — | — | $F_1$ | 1 |
| Example 2D | B | 99 | — | — | $F_1$ | 1 |
| Example 3D | D | 99 | — | — | $F_1$ | 1 |
| Example 4D | E | 99 | — | — | $F_1$ | 1 |
| Example 5D | H | 99 | — | — | $F_1$ | 1 |
| Example 6D | S | 99 | — | — | $F_1$ | 1 |
| Example 7D | T | 99 | — | — | $F_1$ | 1 |
| Example 8D | H | 97 | — | — | $F_1$ | 3 |
| Example 9D | H | 95 | — | — | $F_1$ | 5 |

TABLE 1D-continued

| | PC-PDMS copolymer | | Polycarbonate | | Pigment | |
|---|---|---|---|---|---|---|
| | kind | content (wt. %) | kind | content (wt. %) | kind | content (wt. %) |
| Example 10D | H | 99.9 | — | — | $F_1$ | 0.1 |
| Example 11D | H | 99 | — | — | $F_2$ | 1 |
| Example 12D | H | 99 | — | — | $F_3$ | 1 |
| Comparative Example 1D | — | — | PC-1 | 99 | $F_1$ | 1 |
| Comparative Example 2D | — | — | PC-2 | 99 | $F_1$ | 1 |
| Comparative Example 3D | — | — | PC-3 | 99 | $F_1$ | 1 |
| Example 13D | A | 99 | — | — | $F_4$ | 1 |
| Example 14D | B | 99 | — | — | $F_4$ | 1 |
| Example 15D | D | 99 | — | — | $F_4$ | 1 |
| Example 16D | E | 99 | — | — | $F_4$ | 1 |
| Example 17D | H | 99 | — | — | $F_4$ | 1 |
| Example 18D | s | 99 | — | — | $F_4$ | 1 |
| Example 19D | T | 99 | — | — | $F_4$ | 1 |
| Example 20D | H | 97 | — | — | $F_4$ | 3 |
| Example 21D | H | 95 | — | — | $F_4$ | 5 |
| Example 22D | H | 99.9 | — | — | $F_4$ | 0.1 |
| Comparative Example 4D | — | — | PC-1 | 99 | $F_2$ | 1 |
| Comparative Example 5D | — | — | PC-1 | 99 | $F_3$ | 1 |

TABLE 2D

| | Flame resistance (UL-94) | Izod impact strength (kg-cm/cm) |
|---|---|---|
| Example 1D | V-0 | 77 |
| Example 2D | V-0 | 78 |
| Example 3D | V-0 | 77 |
| Example 3D | V-0 | 76 |
| Example 5D | V-0 | 74 |
| Example 6D | V-0 | 80 |
| Example 7D | V-0 | 81 |
| Example 8D | V-0 | 73 |
| Example 9D | V-0 | 71 |
| Example 10D | V-0 | 79 |
| Example 11D | V-0 | 73 |
| Example 12D | V-0 | 76 |
| Comparative Example 1D | V-2 | 64 |
| Comparative Example 2D | V-2 | 65 |
| Comparative Example 3D | V-2 | 72 |
| Example 13D | V-0 | 16 |
| Example 14D | V-0 | 18 |
| Example 15D | V-0 | 15 |
| Example 16D | V-0 | 14 |
| Example 17D | V-0 | 12 |
| Example 18D | V-0 | 19 |
| Example 19D | V-0 | 20 |
| Example 20D | V-0 | 13 |
| Example 21D | V-0 | 11 |
| Example 22D | V-0 | 23 |
| Comparative Example 4D | V-2 | 62 |
| Comparative Example 5D | V-2 | 61 |

V. Resin Compositions comprising PC-PDMS copolymers and fluororesins

Examples 1E to 9E, Comparative Examples 1E to 5E and Reference Example 1E

By using PC-PDMS copolymers A, B, D, E, H, S and T described above, the polycarbonates PC-1, PC-2 and PC-3 and a fluororesin, materials were premixed by using a dry tumbler in the ratio shown in Table 1E, mixed at 270° C. by feeding into an extruder and pelletized.

The pellets thus obtained were dried at 120° C. for 12 hours and molded by injection to obtain test pieces.

Bending modulus, ultimate strain, flame resistance and kinetic friction coefficient of the test pieces thus obtained were measured for evaluation of quality. Results are shown in Table 2E.

The fluororesins used are as following:
  $G_1$: Polytetrafluoroethylene (a product of Du Pont-Mitsui Fluorochemicals Co., Ltd.; TLP-10F-1)

The measurements were conducted according to the following methods:
1: Bending modulus Bending modulus was measured according to the method of Japanese Industrial Standard K-7103.
2: Ultimate strain Ultimate strain was measured according to the ¼ ellipse method by using a pseudo-gasoline (isooctane/toluene: 6/4).
3: Flame resistance Flame resistance was evaluated according to the method of flame resistance test of Underwriters Laboratory Subject 94 (UL-94), the vertical combustion test, with 1/16 inch thickness 1/32 inch thickness.
4: Kinetic friction coefficient Kinetic friction coefficient was measured according to the method of ASTM D-1894.

TABLE 1E

| | PC-PDMS copolymer | | Polycarbonate | | Fluororesin | |
|---|---|---|---|---|---|---|
| | kind | content (wt. %) | kind | content (wt. %) | kind | content (wt. %) |
| Example 1E | A | 70 | — | — | $G_1$ | 30 |
| Example 2E | B | 70 | — | — | $G_1$ | 30 |
| Example 3E | D | 70 | — | — | $G_1$ | 30 |
| Example 4E | E | 70 | — | — | $G_1$ | 30 |
| Example 5E | H | 70 | — | — | $G_1$ | 30 |
| Example 6E | S | 70 | — | — | $G_1$ | 30 |
| Example 7E | T | 70 | — | — | $G_1$ | 30 |
| Example 8E | H | 80 | — | — | $G_1$ | 20 |
| Example 9E | H | 90 | — | — | $G_1$ | 10 |
| Comparative Example 1E | — | — | PC-1 | 70 | $G_1$ | 30 |
| Comparative Example 2E | — | — | PC-2 | 70 | $G_1$ | 30 |
| Comparative Example 3E | — | — | PC-3 | 70 | $G_1$ | 30 |
| Comparative Example 4E | — | — | PC-1 | 80 | $G_1$ | 20 |
| Comparative Example 5E | — | — | PC-1 | 90 | $G_1$ | 10 |
| Reference Example 1E | H | 100 | — | — | — | — |

TABLE 2E

| | Bending modulus (kg/cm²) | Ultimate strain (%) | Flame resistance (UL-94) | | Kinetic friction coefficient |
|---|---|---|---|---|---|
| | | | 1/16" | 1/32" | |
| Example 1E | 24,000 | 0.45 | V-0 | V-0 | 0.40 |
| Example 2E | 24,100 | 0.44 | V-0 | V-0 | 0.40 |
| Example 3E | 24,000 | 0.45 | V-0 | V-0 | 0.40 |
| Example 4E | 24,200 | 0.44 | V-0 | V-0 | 0.41 |
| Example 5E | 24,300 | 0.43 | V-0 | V-0 | 0.41 |
| Example 6E | 24,100 | 0,42 | V-0 | V-0 | 0.39 |
| Example 7E | 24,100 | 0.42 | V-0 | V-0 | 0.38 |
| Example 8E | 25,200 | 0.74 | V-0 | V-0 | 0.45 |
| Example 9E | 25,500 | >1 | V-0 | V-0 | 0.70 |
| Comparative Example 1E | 24,000 | 0.41 | V-0 | V-2 | 0.41 |
| Comparative Example 2E | 24,000 | 0.40 | V-0 | V-2 | 0.42 |
| Comparative Example 3E | 24,100 | 0.40 | V-0 | V-2 | 0.43 |
| Comparative Example 4E | 25,000 | 0.70 | V-0 | V-2 | 0.47 |
| Comparative Example 5E | 25,300 | >1 | V-0 | V-2 | 0.71 |
| Reference | 26,000 | 0.29 | V-0 | V-2 | 0.99 |

TABLE 2E-continued

| | Bending modulus (kg/cm²) | Ultimate strain (%) | Flame resistance (UL-94) 1/16" | 1/32" | Kinetic friction coefficient |
|---|---|---|---|---|---|
| Example 1E | | | | | |

Examples 10E and 11E and Comparative Examples 6E and 7E

By using PC-PDMS copolymers H and PC-1, the fluororesin and an inorganic filler, materials were compounded in the ratio shown in Table 3E, mixed at 270° C. and pelletized. The inorganic filler was charged at a position down stream of a hopper from which the material resins were charged. The pellets thus obtained were dried at 120° C. for 12 hours and molded by injection to obtain test pieces.

Bending modulus, ultimate strain, flame resistance and kinetic friction coefficient of the test pieces thus obtained were measured for evaluation of quality. Results are shown in Table 4E.

The inorganic fillers used are as following:
$C_1$: Glass fiber (a product of Asahi Fiber Glass Co., Ltd., MA-409C)
$C_3$: Carbon fiber (a product of Toho Rayon Co., Ltd., HTA-C6-SRS)

TABLE 3E

| | PC-PDMS copolymer or polycarbonate | | Fluororesin | | Inorganic filler | |
|---|---|---|---|---|---|---|
| | kind | content (wt. %) | kind | content (wt. %) | kind | content (wt. part) |
| Example 10E | H | 80 | $G_1$ | 10 | $C_1$ | 10 |
| Example 10E | H | 80 | $G_1$ | 10 | $C_3$ | 10 |
| Comparative Example 6E | PC-1 | 80 | $G_1$ | 10 | $C_1$ | 10 |
| Comparative Example 7E | PC-1 | 80 | $G_1$ | 10 | $C_3$ | 10 |

TABLE 4E

| | Bending modulus (kg/cm²) | Ultimate strain (%) | Flame resistance (UL-94) 1/16" | 1/32" | Kinetic friction coefficient |
|---|---|---|---|---|---|
| Example 10E | 45,000 | 0.84 | V-0 | V-0 | 0.52 |
| Example 11E | 63,000 | 0.92 | V-0 | V-0 | 0.53 |
| Comparative Example 6E | 44,000 | 0.82 | V-0 | V-2 | 0.53 |
| Comparative Example 7E | 61,000 | 0.90 | V-0 | V-2 | 0.55 |

VI. Resin compositions comprising PC-PDMS copolymers and styrenic resins

Examples 1F to 14F, Comparative Examples 1F to 10F and Reference Example 1F

By using PC-PDMS copolymers A, B, D, E, H, S and T described above, the polycarbonates PC-1, PC-2 and PC-3 and a styrenic resin, materials were premixed by using a dry tumbler in the ratio shown in Table 1F, mixed at 270° C. by feeding into an extruder and pelletized.

The pellets thus obtained were dried at 120° C. for 12 hours and molded by injection to obtain test pieces.

Tensile strength, Izod impact strength, flame resistance and flow value of the test pieces thus obtained were measured for evaluation of quality. Results are shown in Table 2F.

The styrenic resins used are as following:
$J_1$: ABS (a product of Japan Synthetic Rubber Co., Ltd., DP611)
$J_2$: HISMA (a product of Atlactic Richfield Co., Ltd., USA, DYLARK D250)
$J_3$: GPSMA (a product of Idemitsu Petrochemical Co., Ltd., Moremax UG-430)
$J_4$: HIPS (a product of Idemitsu Petrochemical Co., Ltd., Idemitsu Styrol HT-52)
$J_5$: GPPS (a product of Idemitsu Petrochemical Co., Ltd., Idemitsu Styrol HH-32)
$J_6$: HISMA (a product of Idemitsu Petrochemical Co., Ltd., Moremax UH-830)

TABLE 1F

| | PC-PDMS copolymer | | Polycarbonate | | Styrenic resin | |
|---|---|---|---|---|---|---|
| | kind | content (wt. %) | kind | content (wt. %) | kind | content (wt. %) |
| Example 1F | A | 50 | — | — | $J_1$ | 50 |
| Example 2F | B | 50 | — | — | $J_1$ | 50 |
| Example 3F | D | 50 | — | — | $J_1$ | 50 |
| Example 4F | E | 50 | — | — | $J_1$ | 50 |
| Example 5F | H | 50 | — | — | $J_1$ | 50 |
| Example 6F | S | 50 | — | — | $J_1$ | 50 |
| Example 7F | T | 50 | — | — | $J_1$ | 50 |
| Example 8F | H | 70 | — | — | $J_1$ | 30 |
| Example 9F | H | 70 | — | — | $J_2$ | 30 |
| Example 10F | H | 30 | — | — | $J_2$ | 70 |
| Example 11F | H | 80 | — | — | $J_3$ | 20 |
| Example 12F | H | 90 | — | — | $J_4$ | 10 |
| Example 13F | H | 90 | — | — | $J_5$ | 10 |
| Example 14F | H | 70 | — | — | $J_6$ | 30 |
| Comparative Example 1F | — | — | PC-1 | 50 | $J_1$ | 50 |
| Comparative Example 2F | — | — | PC-2 | 50 | $J_1$ | 50 |
| Comparative Example 3F | — | — | PC-3 | 50 | $J_1$ | 50 |
| Comparative Example 4F | — | — | PC-1 | 70 | $J_1$ | 30 |
| Comparative Example 5F | — | — | PC-1 | 70 | $J_2$ | 30 |
| Comparative Example 6F | — | — | PC-1 | 30 | $J_2$ | 70 |
| Comparative Example 7F | — | — | PC-1 | 80 | $J_3$ | 20 |
| Comparative Example 8F | — | — | PC-1 | 90 | $J_4$ | 10 |
| Comparative Example 9F | — | — | PC-1 | 90 | $J_5$ | 10 |
| Comparative Example 10F | — | — | PC-1 | 70 | $J_6$ | 30 |
| Reference Example 1F | H | 100 | — | — | — | 0 |

TABLE 2F

| | Tensile strength (kg/cm²) | Izod impact strength (kg-cm/cm) | Flame resistance (UL-94) 1/16" | Flow value (ml/sec) |
|---|---|---|---|---|
| Example 1F | 530 | 85 | V-0 | $38 \times 10^{-2}$ |
| Example 2F | 530 | 85 | V-0 | $39 \times 10^{-2}$ |
| Example 3F | 530 | 84 | V-0 | $37 \times 10^{-2}$ |
| Example 4F | 540 | 83 | V-0 | $41 \times 10^{-2}$ |
| Example 5F | 540 | 84 | V-0 | $42 \times 10^{-2}$ |
| Example 6F | 520 | 84 | V-0 | $39 \times 10^{-2}$ |
| Example 7F | 520 | 85 | V-0 | $40 \times 10^{-2}$ |
| Example 8F | 550 | 85 | V-0 | $21 \times 10^{-2}$ |
| Example 9F | 550 | 87 | V-0 | $41 \times 10^{-2}$ |
| Example 10F | 530 | 65 | V-0 | $66 \times 10^{-2}$ |
| Example 11F | 630 | 85 | V-0 | $26 \times 10^{-2}$ |
| Example 12F | 650 | 82 | V-0 | $26 \times 10^{-2}$ |
| Example 13F | 620 | 83 | V-0 | $22 \times 10^{-2}$ |
| Example 14F | 550 | 87 | V-0 | $41 \times 10^{-2}$ |

TABLE 2F-continued

|  | Tensile strength (kg/cm$^2$) | Izod impact strength (kg-cm/cm) | Flame resistance (UL-94) 1/16" | Flow value (ml/sec) |
|---|---|---|---|---|
| Comparative Example 1F | 530 | 70 | V-2 | 40 × 10$^{-2}$ |
| Comparative Example 2F | 530 | 75 | V-2 | 39 × 10$^{-2}$ |
| Comparative Example 3F | 530 | 78 | V-2 | 41 × 10$^{-2}$ |
| Comparative Example 4F | 550 | 83 | V-2 | 20 × 10$^{-2}$ |
| Comparative Example 5F | 550 | 85 | V-2 | 40 × 10$^{-2}$ |
| Comparative Example 6F | 530 | 50 | lower than V-2 | 65 × 10$^{-2}$ |
| Comparative Example 7F | 620 | 82 | V-0 | 24 × 10$^{-2}$ |
| Comparative Example 8F | 640 | 80 | V-2 | 24 × 10$^{-2}$ |
| Comparative Example 9F | 610 | 82 | V-0 | 20 × 10$^{-2}$ |
| Comparative Example 10F | 550 | 85 | V-2 | 40 × 10$^{-2}$ |
| Reference Example 1F | 650 | 69 | V-0 | 6 × 10$^{-2}$ |

Examples 15F to 17F and Comparative Examples 11F to 13F

By using PC-PDMS copolymer H and the polycarbonate PC-1, the styrenic resin J$_1$ and an inorganic filler, materials were compounded in the ratio shown in Table 3F, mixed at 270° C. and pelletized. The inorganic filler was charged at a position down stream of a hopper from which the material resins were charged. The pellets thus obtained were dried at 120° C. for 12 hours and molded by injection to obtain test pieces. Tensile strength, Izod impact strength, flame resistance and flow value of the test pieces thus obtained were measured for evaluation of quality. Results are shown in Table 4F.

TABLE 3F

|  | PC-PDMS copolymer or polycarbonate | | Styrenic resin | | Inorganic filler | |
|---|---|---|---|---|---|---|
|  | kind | content (wt. %) | kind | content (wt. %) | kind | content (wt. part) |
| Example 15F | H | 45 | J$_1$ | 45 | C$_1$ | 10 |
| Example 16F | H | 45 | J$_1$ | 45 | C$_3$ | 10 |
| Example 17F | H | 80 | J$_1$ | 10 | C$_3$ | 10 |
| Comparative Example 11F | PC-1 | 45 | J$_1$ | 45 | C$_1$ | 10 |
| Comparative Example 12F | PC-1 | 45 | J$_1$ | 45 | C$_3$ | 10 |
| Comparative Example 13F | PC-1 | 80 | J$_1$ | 10 | C$_3$ | 10 |

TABLE 4F

|  | Tensile strength (kg/cm$^2$) | Izod impact strength (kg-cm/cm) | Flame resistance (UL-94) | Flow value (ml/sec) |
|---|---|---|---|---|
| Example 15F | 1,100 | 13 | V-0 | 29 × 10$^{-2}$ |
| Example 16F | 1,400 | 14 | V-0 | 25 × 10$^{-2}$ |
| Example 17F | 1,500 | 15 | V-0 | 22 × 10$^{-2}$ |
| Comparative Example 11F | 1,100 | 18 | V-0 | 26 × 10$^{-2}$ |
| Comparative Example 12F | 1,400 | 19 | V-0 | 24 × 10$^{-2}$ |
| Comparative Example 13F | 1,500 | 19 | V-0 | 20 × 10$^{-2}$ |

VII. Resin compositions comprising PC-PDMS copolymers and PTFE having ability of fibril formation Examples 1G to 10G, Comparative Examples 1G to 4G and Reference Example 1G By using PC-PDMS copolymers A, B, D, E, H, S and T described above, the polycarbonates PC-1, PC-2 and PC-3 and PTFE having the ability of fibril formation, materials were premixed by using a dry tumbler in the ratio shown in Table 1G, mixed at 270° C. by feeding into an extruder and pelletized.

The pellets thus obtained were dried at 120° C. for 12 hours and molded by injection to obtain test pieces.

Flame resistance and Izod impact resistance of the test pieces thus obtained were measured for evaluation of quality. Results are shown in Table 2G.

For the measurement of the flame resistance, 1/64 inch test pieces was prepared by cutting of 1/32 inch test pieces.

PTFE having the ability of fibril formation used are as following:

K$_1$: Algoflon F5 (a product of Montefluos Co.)
K$_2$: Teflon 6J (a product of Du Pont-Mitsui Fluorochemicals Co., Ltd.)

TABLE 1G

|  | PC-PDMS copolymer | | Polycarbonate | | PTFE having the ability of fibril formation | |
|---|---|---|---|---|---|---|
|  | kind | content (wt. part) | kind | content (wt. part) | kind | content (wt. part) |
| Example 1G | A | 100 | — | — | K$_1$ | 0.1 |
| Example 2G | B | 100 | — | — | K$_1$ | 0.1 |
| Example 3G | D | 100 | — | — | K$_1$ | 0.1 |
| Example 4G | E | 100 | — | — | K$_1$ | 0.1 |
| Example 5G | H | 100 | — | — | K$_1$ | 0.1 |
| Example 6G | S | 100 | — | — | K$_1$ | 0.1 |
| Example 7G | T | 100 | — | — | K$_1$ | 0.1 |
| Example 8G | H | 100 | — | — | K$_1$ | 0.05 |
| Example 9G | H | 100 | — | — | K$_1$ | 0.03 |
| Example 10G | H | 100 | — | — | K$_2$ | 0.1 |
| Comparative Example 1G | — | — | PC-1 | 100 | K$_1$ | 0.1 |
| Comparative Example 2G | — | — | PC-2 | 100 | K$_1$ | 0.1 |
| Comparative Example 3G | — | — | PC-3 | 100 | K$_1$ | 0.1 |
| Comparative Example 4G | — | — | PC-1 | 100 | K$_2$ | 0.1 |
| Reference Example 1G | H | 100 | — | — | — | — |

TABLE 2G

|  | Flame resistance (UL-94) | | Izod impact strength (kg-cm/cm) |
|---|---|---|---|
|  | 1/32" | 1/64" |  |
| Example 1G | V-0 | V-0 | 76 |
| Example 2G | V-0 | V-0 | 80 |
| Example 3G | V-0 | V-0 | 76 |
| Example 4G | V-0 | V-0 | 75 |
| Example 5G | V-0 | V-0 | 73 |
| Example 6G | V-0 | V-0 | 75 |
| Example 7G | V-0 | V-0 | 75 |
| Example 8G | V-0 | V-0 | 74 |
| Example 9G | V-0 | V-0 | 74 |
| Example 10G | V-0 | V-0 | 72 |
| Comparative Example 1G | V-0 | V-2 | 74 |
| Comparative Example 2G | V-0 | V-2 | 75 |
| Comparative Example 3G | lower than V-2 | lower than V-2 | 76 |
| Comparative Example 4G | V-0 | V-2 | 74 |
| Reference | V-0 | V-2 | 74 |

TABLE 2G-continued

| | Flame resistance (UL-94) | | Izod impact strength |
|---|---|---|---|
| | 1/32" | 1/64" | (kg-cm/cm) |
| Example 1G | | | 5 |

To summarize the advantages obtained by the invention, PC-PDMS copolymer and the resin composition comprising said copolymer of the present invention has excellent flame resistance, mechanical properties, transparency and mold releasing property. They have also excellent flow property, sliding property or solvent resistance.

Therefore, PC-PDMS copolymer and the resin composition comprising said copolymer of the present invention are effectively utilized as materials for various molded articles, such as parts of automobiles, building materials, electric appliances, office automation apparatuses and the like.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A polycarbonate-polyorganosiloxane copolymer comprising in a main chain:

(a) a repeating unit I represented by the formula (I):

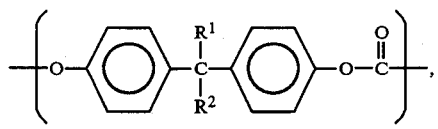

wherein $R^1$ and $R^2$ are, respectively, a hydrogen atom or an alkyl group having 1 to 4 carbon atoms and are the same or different from each other;

(b) a repeating unit II represented by the formula (II):

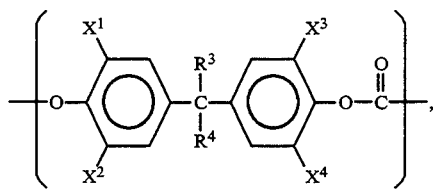

wherein $R^3$ and $R^4$ are each a hydrogen atom or an alkyl group having 1 to 4 carbon atoms and are the same or different from each other and $X^1$ to $X^4$ are each a halogen atom;

(c) a structural unit III represented by the formula (III):

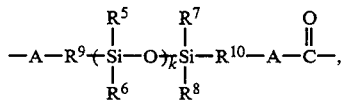

wherein $R^5$ to $R^8$ are each a hydrogen atom, an alkyl group having 1 to 6 carbon atoms or a phenyl group and are the same or different from each other, $R^9$ and $R^{10}$ are each an organic group containing an aliphatic group or an aromatic group,
   A is —O—, —NH— or a single bond and
   k is an integer of 1 to 100;
   and a terminal group IV at least at one terminal end of the copolymer, the terminal group (IV) being a polyhalogenophenoxy group represented by the formula (IV):

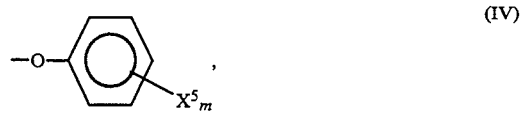

wherein $X^5$ is a halogen atom,
   m is an integer of 1 to 5 and when m is 2 or more each $X^5$ are the same or different from each other;
   the repeating unit II in the main chain being in an amount of 1 to 10 mol % based on the total contents of the repeating unit I and the repeating unit II; the structural unit III being in an amount of 0.01 to 1.3 weight % based on the total contents of the repeating unit I, the repeating unit II and the structural unit III; and the copolymer having a viscosity average molecular weight of 10,000 to 50,000.

2. A resin composition comprising (A) 0.1 to 99.9 weight % of the polycarbonate-polyorganosiloxane copolymer described in claim 1 and (B) 99.9 to 0.1 weight % of a polycarbonate.

3. A resin composition comprising (A) 1 to 99 weight % of the polycarbonate-polyorganosiloxane copolymer described in claim 1, (B) 0 to 98 weight % of a polycarbonate and 1 to 60 weight % of inorganic filler.

4. A resin composition comprising (A) 85 to 99.99 weight % of the polycarbonate-polyorganosiloxane copolymer described in claim 1 and (B) 15 to 0.01 weight % of pigment.

5. A resin composition comprising (A) 1 to 99 weight % of the polycarbonate-polyorganosiloxane copolymer described in claim 1 and (B) 99 to 1 weight % of a fluororesin.

6. A resin composition comprising (A) 1 to 99 weight % of the polycarbonate-polyorganosiloxane copolymer described in claim 1 and (B) 99 to 1 weight % of a styrenic resin.

7. A resin composition comprising (A) 100 weight parts of the polycarbonate-polyorganosiloxane copolymer described in claim 1 and (B) 0.01 to 2 weight parts of a polytetrafluoroethylene having the ability of fibril formation.

8. The polycarbonate-polyorganosiloxane copolymer of claim 1, wherein said terminal group IV is at both terminal ends of said copolymer.

9. The polycarbonate-polyorganosiloxane copolymer of claim 1, wherein the repeating unit II is in an amount of 2 to 8 mol %, based on the total contents of the repeating unit I and the repeating unit II.

10. The polycarbonate-polyorganosiloxane copolymer of claim 9, wherein the repeating unit III is in an amount of 0.02 to 1.3 weight %, based on the total contents of the repeating unit II and the repeating unit III.

11. The polycarbonate-polyorganosiloxane copolymer of claim 10, wherein the viscosity average molecular weight is 12,000 to 40,000.

12. The polycarbonate-polyorganosiloxane copolymer of claim 11, wherein said copolymer has a halogen content of 4 weight % or more.

13. The polycarbonate-polyorganosiloxane copolymer of claim 11, wherein said copolymer has a halogen content of 4.5 weight % or more.

14. The resin composition of claim 3, wherein the polycarbonate-polyorganosilane copolymer is in an amount of 2 to 95 weight %; the polycarbonate is in an amount of 0 to 90 weight %; the inorganic filler is in an amount of 5 to 55 weight %; and the inorganic filler is selected from the group consisting of aluminum fiber, calcium carbonate, magnesium carbonate, dolomite, silica, diatomaceous earth, alumina, iron oxide, zinc oxide, magnesium oxide, calcium sulfate, magnesium sulfate, calcium sulfite, talc, mica, asbestos, calcium silicate, montmorillonite, bentonite, graphite, iron powder, lead powder and aluminum powder.

15. The resin composition of claim 5, wherein the polycarbonate-polyorganosilane copolymer is in an amount of 40 to 98 weight %; the fluororesin is in an amount of 60 to 2 weight %; and the fluororesin is selected from the group consisting of polytetrafluoroethylene, polychlorotrifluoroethylene, polyvinyl fluoride, polyvinylidene fluoride, hexafluoropropylenetetrafluoroethylene copolymer and chlorotrifluoroethylenevinylidene fluoride.

16. The resin composition of claim 4, wherein the polycarbonate-polyorganosilane copolymer is in an amount of 90 to 99.9 weight %; the pigment is in an amount of 10 to 0.1 weight %; and the pigment is selected from the group consisting of titanium dioxide, zinc oxide, zinc sulfide, barium sulfate, lithopone, lead white and carbon black.

17. The resin composition of claim 6, wherein the polycarbonate-polyorganosiloxane copolymer is in an amount of 30 to 95 weight %; the styrenic resin is in an amount of 70 to 5 weight %; and the styrenic resin is selected from the group consisting of polystyrene resin, styrene-maleic anhydride copolymer, acrylonitrile-styrene resin and acrylonitrile-butadiene-styrene resin.

18. The resin composition of claim 7, wherein the polytetrafluoroethylene is in an amount of 0.02 to 1.5 weight parts.

* * * * *